US012614122B2

(12) United States Patent
Danilyuk et al.

(10) Patent No.: US 12,614,122 B2
(45) Date of Patent: Apr. 28, 2026

(54) METHOD AND A SYSTEM OF DETERMINING LIDAR DATA DEGRADATION DEGREE

(71) Applicant: YANDEX SELF DRIVING GROUP LLC, Moscow (RU)

(72) Inventors: Kirill Evgenevich Danilyuk, g. Podolsk (RU); Dmitry Sergeevich Tochilkin, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 693 days.

(21) Appl. No.: 18/087,213

(22) Filed: Dec. 22, 2022

(65) Prior Publication Data

US 2023/0214728 A1     Jul. 6, 2023

(30) Foreign Application Priority Data

Dec. 30, 2021     (RU) ........................... RU2021139992

(51) Int. Cl.
　　*G06N 20/20*　　　(2019.01)
　　*G01S 7/497*　　　(2006.01)
　　　　　　(Continued)

(52) U.S. Cl.
　　CPC .............. *G06N 20/20* (2019.01); *G01S 7/497* (2013.01); *G06N 5/01* (2023.01); *G06V 10/7625* (2022.01);
　　　　　　(Continued)

(58) Field of Classification Search
　　CPC ........ G06N 20/00; G06N 20/10; G06N 20/20; G06N 5/01; G06N 5/02; G06N 5/022;
　　　　　　(Continued)

(56) References Cited

U.S. PATENT DOCUMENTS 6,799,904 B2　　10/2004　Schaefer et al.
8,907,250 B2　　12/2014　Bressand et al.
　　　　　　(Continued)

FOREIGN PATENT DOCUMENTS

DE　　102004057322 A1　　6/2006
DE　　102017222996 A1　　6/2019
　　　　　　(Continued)

OTHER PUBLICATIONS

European Search Report with regard to the counterpart EP Patent Application No. 22215857.8 completed Apr. 27, 2023.
　　　　　　(Continued)

*Primary Examiner* — Shane D Woolwine
(74) *Attorney, Agent, or Firm* — BCF LLP

(57)　　　　ABSTRACT

A system and method for for determining a degree of point cloud data degradation of a LiDAR sensor of a Self-Driving Car (SDC) using a machine-learning algorithm (MLA) are provided. The method comprises: determining, based on a training point cloud generated by the LiDAR sensor representative of surroundings of the SDC, a plurality of LiDAR features; determining, for each training object in the surroundings, based on statistical data of coverage of training objects with LiDAR points, a plurality of enrichment features; receiving a respective label indicative of a degradation degree of the training point cloud; generating, based on the plurality of LiDAR features, the plurality of enrichment features, and the respective label, a given feature vector of a plurality of feature vectors; training, based on the plurality of feature vectors, the MLA to determine an in-use degree of degradation of in-use sensed data further generated by the LiDAR sensor.

20 Claims, 9 Drawing Sheets

(51) Int. Cl.

| | |
|---|---|
| *G01S 17/931* | (2020.01) |
| *G06N 5/01* | (2023.01) |
| *G06V 10/762* | (2022.01) |
| *G06V 10/774* | (2022.01) |
| *G06V 10/776* | (2022.01) |
| *G06V 10/778* | (2022.01) |
| *G06V 10/80* | (2022.01) |
| *G06V 10/82* | (2022.01) |
| *G06V 20/56* | (2022.01) |

(52) U.S. Cl.
CPC .......... *G06V 10/774* (2022.01); *G06V 10/776* (2022.01); *G06V 10/778* (2022.01); *G06V 10/803* (2022.01); *G06V 10/82* (2022.01); *G06V 20/56* (2022.01); *G01S 2007/4975* (2013.01); *G01S 2007/4977* (2013.01); *G01S 17/931* (2020.01)

(58) Field of Classification Search
CPC ........ G06N 5/025; G06N 5/027; G01S 7/497; G01S 17/931; G01S 2007/4975; G01S 2007/4977; G06V 10/7625; G06V 10/774; G06V 10/776; G06V 10/778; G06V 10/803; G06V 10/82; G06V 20/56
See application file for complete search history.

(56) References Cited

U.S. PATENT DOCUMENTS

| | | | |
|---|---|---|---|
| 9,098,754 | B1 | 8/2015 | Stout et al. |
| 9,395,538 | B2 | 7/2016 | Hui et al. |
| 9,503,619 | B2 | 11/2016 | Hacker et al. |
| 9,508,015 | B2 | 11/2016 | Strauss et al. |
| 9,555,740 | B1 | 1/2017 | Zhu et al. |
| 9,913,319 | B2 | 3/2018 | Timmermann et al. |
| 9,961,240 | B2 | 5/2018 | Wato |
| 10,345,580 | B2 | 7/2019 | Wehninck |
| 10,351,073 | B2 | 7/2019 | Usami et al. |
| 10,397,982 | B2 | 8/2019 | Usami et al. |
| 10,479,287 | B2 | 11/2019 | Sliwa et al. |
| 2017/0129404 | A1 | 5/2017 | Oda |
| 2018/0213610 | A1 | 7/2018 | Futatsugi |
| 2018/0242404 | A1 | 8/2018 | Wehninck |
| 2018/0312116 | A1 | 11/2018 | Brok |
| 2019/0164084 | A1 | 5/2019 | Gulin et al. |
| 2019/0176762 | A1 | 6/2019 | Ooji et al. |
| 2019/0193683 | A1 | 6/2019 | Oikawa |
| 2019/0193684 | A1 | 6/2019 | Oikawa |
| 2019/0200416 | A1 | 6/2019 | Shinkai |
| 2020/0090322 | A1 | 3/2020 | Seo et al. |
| 2020/0090352 | A1 | 3/2020 | Murashkin et al. |
| 2020/0142041 | A1 | 5/2020 | Gassend et al. |
| 2020/0209853 | A1 | 7/2020 | Leach et al. |
| 2020/0309923 | A1 | 10/2020 | Bhaskaran et al. |
| 2021/0063578 | A1* | 3/2021 | Wekel .................. G01S 17/894 |
| 2021/0190923 | A1 | 6/2021 | Golomedov et al. |
| 2021/0373172 | A1 | 12/2021 | Solomentsev et al. |
| 2022/0161815 | A1* | 5/2022 | Van Beek ............. B60W 40/09 |
| 2022/0164609 | A1* | 5/2022 | Lee .......................... G06F 18/25 |

FOREIGN PATENT DOCUMENTS

| | | |
|---|---|---|
| GB | 2576206 A | 2/2020 |
| RU | 2694001 C2 | 7/2019 |
| RU | 2019143603 A | 6/2021 |
| WO | 2020159638 A1 | 8/2020 |

OTHER PUBLICATIONS

Search Report with regard to the counterpart RU Patent Application No. 2021139992 completed Jan. 30, 2024.

Zhang et al., "LiDAR Degradation Quantification for Autonomous Driving in Rain", IEEE/RSJ International Conference on Intelligent Robots and Systems (IROS), IEEE, 2021, pp. 3458-3464.

Chen et al., "Cross-Modal Matching CNN for Autonomous Driving Sensor Data Monitoring", 2021 IEEE/CVF International Conference on Computer Vision Workshops (ICCVW), Oct. 2021, https://avvision.xyz/iccv21/papers/29/CameraReady/29.pdf.

Vargas Rivero et al., "Characterization and Simulation of the Effect of Road Dirt on the Performance of a Laser Scanner", Published in Oct. 2017, IEEE 20th International Conference on Intelligent Transportation Systems (ITSC), pp. 1-6, https://www.lens.org/lens/scholar/article/127-483-570-407-019/main.

James, Jyothish K. et al., "Classification of LIDAR sensor contaminations with deep neural networks." Proceedings of the Computer Science in Cars Symposium (CSCS), Sep. 13-14, 2018, Munich, Germany.

Baker-Campbell, "Sensor Cleaning Tech: How Engineers Protect Sensors From Bugs, Bird Droppings, Dirt & Grime", https://www.autovision-news.com/sensing/sensor-technology/sensor-cleaning/. Retrieved from the Internet on Dec. 16, 2021.

Heinzler et al., "Weather Influence and Classification with Automotive Lidar Sensors", Published on Jun. 18, 2019, https://www.forbes.com/sites/samabuelsamid/2019/09/04/ford-launches-bugs-at-sensors-keeping-it-clean-will-be-crucial-for-automated-vehicles/?sh=a36c4675002d.

Alarcon, "Drive Labs: Helping Cameras See Clearly With AI", Published on May 15, 2019, https://developer.nvidia.com/blog/drive-labs-helping-cameras-see-clearly-with-ai/.

* cited by examiner

METHOD AND A SYSTEM OF DETERMINING LIDAR DATA DEGRADATION DEGREE

CROSS-REFERENCE

The present application claims priority to Russian Patent Application No. 2021139992, entitled "Method and a System of Determining LIDAR Data Degradation Degree," filed Dec. 30, 2021, the entirety of which is incorporated by reference herein.

FIELD

The present technology relates generally to Light Detection and Ranging (LiDAR) systems; and in particular, to a method and a system of determining LiDAR data degradation degree.

BACKGROUND

LiDAR sensors (Light Detection and Ranging systems, also referred to as LiDAR or LiDAR sensors) are widely used in self-driving (autonomous) vehicles. LiDAR sensors allow measurement of distances between the system and surrounding objects by irradiating the surroundings with light and collecting light reflected from one or more objects (such as other vehicles, pedestrians, road posts, and the like) in the surroundings.

In a typical LiDAR sensor, a light source emits narrow beams which are scanned across a field of view. Light reflected and/or scattered from an object in the field of view is received by a detection unit of the LiDAR sensor to determine a position of the object. For Time-of-Flight (ToF) systems, for example, time between (i) emission of the light beam and (ii) detection of the reflected and/or scattered light beam is measured to determine the distance to the object.

The reflected beams received by the LiDAR sensor are processed to generate data points using a central computer, wherein each pulse of the beam corresponds to a respective data point, thereby generating LiDAR image data, including, for example, a point cloud representing the surrounding environment as a 3D map. As the 3D map is more or less detailed and accurate depending on the density or refresh rate of the point cloud, generally speaking, the greater the sampling rate over the field of view, the more detailed and accurate is the 3D map.

In another example, the LiDAR sensor can be used in the SDC for real-time detection of objects present in surroundings of the SDC along a pre-generated 3D map. By determining distances to the objects using the LiDAR sensor, the central computer of the SDC can be configured to determine a movement trajectory for the SDC, or otherwise amend an existing movement trajectory thereof.

However, due to certain reasons, for example, weather conditions, such as snow, rain, or excess cloudiness, the field of view of the LiDAR sensor can be, at least partially, obscured. Also, the field of view of the LiDAR sensor can be reduced and/or obscured due to an exit window of the LiDAR sensor being contaminated, such as with dirt, dust, or other elements, as an example. This may weaken the ability of the LiDAR sensor to output the light beam towards at least a portion of the surroundings of the SDC and/or detect the light reflected therefrom, thereby causing degradation of the LiDAR image data representative of the surroundings of the SDC. Consequently, the accuracy of the 3D map or that of the movement trajectory of the SDC generated based on the degraded LiDAR image data can be compromised, which may result, for example, in the SDC, during movement thereof, colliding with one or more objects, causing car accidents.

Certain prior art approaches have been proposed to address the above-identified technical problem.

United States Patent Application Publication No.: 2020/0309,923-A1 published on Oct. 1, 2020, assigned to Zoox Inc., and entitled "IDENTIFYING AND/OR REMOVING FALSE POSITIVE DETECTIONS FROM LiDAR SENSOR OUTPUT" discloses a machine-learned (ML) model for detecting that depth data (e.g., LiDAR data, radar data) comprises a false positive attributable to particulate matter, such as dust, steam, smoke, rain, etc. The ML model may be trained based at least in part on simulated depth data generated by a fluid dynamics model and/or by collecting depth data during operation of a device (e.g., an autonomous vehicle. In some examples, an autonomous vehicle may identify depth data that may be associated with particulate matter based at least in part on an outlier region in a thermal image. For example, the outlier region may be associated with steam.

International Patent Application Publication No.: 2020/0159,638-A1 published on Aug. 8, 2020, assigned to HRL LABORATORIES, LLC, and entitled "SYSTEM AND METHOD FOR UNSUPERVISED DOMAIN ADAPTATION VIA SLICED-WASSERSTEIN DISTANCE" discloses a system for unsupervised domain adaptation in an autonomous learning agent. The system adapts a learned model with a set of unlabeled data from a target domain, resulting in an adapted model. The learned model was previously trained to perform a task using a set of labeled data from a source domain. The set of labeled data has a first input data distribution, and the set of unlabeled target data has a second input data distribution that is distinct from the first input data distribution. The adapted model is implemented in the autonomous learning agent, causing the autonomous learning agent to perform the task in the target domain.

U.S. Pat. No. 9,555,540-B1 issued on Jan. 31, 2017, assigned to Google LLC, and entitled "CROSS-VALIDATING SENSORS OF AN AUTONOMOUS VEHICLE", discloses methods and systems for or cross-validating a second sensor with a first sensor. Cross-validating the second sensor may include obtaining sensor readings from the first sensor and comparing the sensor readings from the first sensor with sensor readings obtained from the second sensor. In particular, the comparison of the sensor readings may include comparing state information about a vehicle detected by the first sensor and the second sensor. In addition, comparing the sensor readings may include obtaining a first image from the first sensor, obtaining a second image from the second sensor, and then comparing various characteristics of the images. One characteristic that may be compared are object labels applied to the vehicle detected by the first and second sensor. The first and second sensors may be different types of sensors.

SUMMARY

Therefore, there is a need for systems and methods which avoid, reduce or overcome the limitations of the prior art.

Developers of the present technology have devised the present methods and systems for determining a degree of the LiDAR image data degradation using a specifically trained machine-learning algorithm (MLA). As used herein, the degree of LiDAR data degradation is a measure indicative of a current maximum distance at which the LiDAR sensor can detect objects in a given portion of the surroundings of the SDC with a given predetermined confidence level. This may further be indicative of how much the exit window of the LiDAR sensor is contaminated, as an example.

Thus, to train the MLA to determine the degree of LiDAR data degradation, the present methods comprise generating a training set of data including certain coverage statistical data of the objects present in a given portion of the surroundings of the SDC with LiDAR points of a training point cloud generated by the LiDAR sensor. More specifically, according to the non-limiting embodiments of the methods described herein, determining the coverage statistical data can comprise: (i) projecting the training point cloud onto a training image representative of the same given portion of the surroundings of the SDC, generated, for example, by a camera sensor of the SDC at a same moment of time as the LiDAR image data; and (ii) determining a number and parameters of LiDAR points having fallen within a respective 2D representation of a given training object in the training image from the camera sensor. Further, for each such a merged representation of the surroundings of the SDC, an assessor-generated label can be received, which is indicative of whether a reference training object (such as the given training object or any other training object present in the training image), positioned at a given predetermined distance value from the SDC, is covered with the LiDAR points or not, as perceived by a respective human assessor.

The developers have also appreciated that due to human error, the assessor-generated labels can be inaccurate and thus can be revised using a secondary MLA trained, based on at least a portion of the training set of data described above, to generate machine generated labels for replacing the assessor-generated labels, based, for example, on associated prediction confidence levels of the former.

By doing so, the non-limiting embodiments of the present methods and systems allow increasing accuracy in determining the degradation of the LiDAR data generated by the LiDAR sensor as the SDC is en route, which can be instrumental in triggering certain preventive actions, such as cleaning the exit window of the LiDAR sensor, requesting maintenance of the LiDAR sensor, or decelerating the SDC, as an example. By doing so, the non-limiting embodiments of the present methods and systems may help prevent car accidents caused by collisions of the SDC with other objects due to poor visibility conditions associated with the LiDAR sensor.

Thus, in accordance with a first broad aspect of the present technology, there is provided A computer-implemented method of determining a degree of image data degradation of a LiDAR sensor of a Self-Driving Car (SDC) using a Machine-Learning Algorithm (MLA). The method is executable by a processor communicatively coupled to the LiDAR sensor. The method comprises, during a training phase, training the MLA by: receiving, by the processor from the LiDAR sensor, training sensed data including a given training point cloud representative of a given portion of a surrounding area of the SDC; determining, by the processor, based on the given training point cloud, a plurality of LiDAR features associated with the given portion of the surrounding area of the SDC; receiving, by the processor from a camera sensor of the SDC, a respective training image representative of the given portion of the surrounding area of the SDC, the respective training image having been generated, by the camera sensor, at a same time as the training sensed data by the LiDAR sensor; projecting, by the processor, the given training point cloud onto the respective training image to generate a merged representation of the given portion of the surrounding area of the SDC including statistical data of coverage of training objects present in the respective image with LiDAR points; determining, by the processor, for each training object present in the given portion of the surrounding area of the SDC, based on the statistical data, a plurality of enrichment features; receiving, by the processor, for the merged representation of the given portion, a respective label indicative of a degradation degree of the training sensed data generated by the LiDAR sensor; generating, by the processor, based on the plurality of LiDAR features, the plurality of enrichment features associated with each training object present in the given portion of the surrounding area, and the respective label, a given training feature vector of a plurality of training feature vectors; training, by the processor, the MLA based on the plurality of training feature vectors to determine an in-use degree of degradation of in-use sensed data of the LiDAR sensor representative of in-use objects in the surrounding area of the SDC.

In some implementations of the method, the plurality of LiDAR features includes: (i) a number of LiDAR points in the given training point cloud; and (ii) light intensity values of the LiDAR points in the given training point cloud.

In some implementations of the method, the determining the plurality of LiDAR features comprises: defining, along a horizontal field of view (HFOV) of the LiDAR sensor, a plurality of angles of the HFOV; and determining the plurality of LiDAR features for LiDAR points of the given training point cloud having fallen in each angle of the plurality of angles the HFOV of the LiDAR sensor.

In some implementations of the method, the determining the plurality of enrichment features for a given training object in the given portion of the surrounding area of the SDC includes: generating, by the processor, a respective bounding box representative of the given training object; and determining, by the processor, at least one of:

a respective distance value from the SDC to the given training object;

a number of the training objects in the given portion of the surrounding area;

a surface area of the respective bounding box associated with the given training object;

a number of LiDAR points having fallen within the respective bounding box;

a density of the LiDAR points having fallen within the respective bounding box;

light intensity values of the LiDAR points having fallen within the respective bounding box;

average distance values from the LiDAR sensor to the LiDAR points having fallen within the respective bounding box; and energy values of the LiDAR points having fallen within the respective bounding box.

In some implementations of the method, the respective label comprises data indicative of whether at least one reference training object is covered with LiDAR points at the respective distance value from the SDC.

In some implementations of the method, the given training object is of a first predetermined object class, and the at least one reference training object is of a second predetermined object class, different from the first predetermined object class.

In some implementations of the method, the first predetermined object class is a vehicle.

In some implementations of the method, the generating the given training feature vector further comprises: determining, by the processor, based on the merged representation, a number of bounding boxes void of LiDAR points; and determining, by the processor, surface area values of the bounding boxes void of LiDAR points.

In some implementations of the method, the respective label has been generated by a human assessor, and the degradation degree of the training sensed data has been determined as being perceived by the human assessor.

In some implementations of the method, the generating the given training feature vector comprises adjusting the respective label using a machine-generated label indicative of a predicted degradation degree of the training sensed data, the predicted degradation degree having been determined by a secondary MLA, which has been trained to determine predicted degradation degrees of the training sensed data of the LiDAR sensor, the secondary MLA being different from the MLA, the adjusting comprising: in response to every one of: (i) the predicted degradation degree of the training sensed data generated by the secondary MLA being misaligned with the degradation degree indicated by the respective label; (ii) the predicted degradation degree of the training sensed data being higher than the degradation degree; and (iii) a confidence level associated with the predicted degradation degree being equal to or greater than a predetermined confidence level threshold, replacing the respective label with the machine-generated label in the given training feature vector.

In some implementations of the method, the secondary MLA has been trained based on at least a portion of the plurality of training feature vectors.

In some implementations of the method, each one of the MLA and the secondary MLA is a decision tree-based MLA.

In some implementations of the method, each one of the MLA and the secondary MLA is a respective decision tree forest.

In some implementations of the method, the secondary MLA has a lower dimensionality than that of the MLA.

In some implementations of the method, the decision-tree based MLA is a CatBoost decision tree MLA.

In some implementations of the method, the method further comprises, in response to the replacing respective label with the machine-generated label in the given training feature vector: generating a given reduced training feature vector based on the plurality of LiDAR features and the respective label; and including the given reduced training feature vector in the plurality of training feature vectors.

In some implementations of the method, the method further comprises, during an in-use phase following the training phase, using the MLA to determine the in-use degree of degradation image data degradation of the LiDAR sensor of the SDC, the using comprising: receiving, by the processor from the LiDAR sensor, the in-use sensed data including an in-use point cloud representative of the given portion of the surrounding area of the SDC; determining, by the processor, based on the in-use point cloud, the plurality of LiDAR features associated with the given portion of the surrounding area of the SDC; receiving, by the processor from a camera sensor of the SDC, a respective in-use image representative of the given portion of the surrounding area of the SDC, the respective in-use image having been generated, by the camera sensor, at the same time as the in-use sensed data by the LiDAR sensor; projecting, by the processor, the in-use point cloud onto the respective in-use image to generate an in-use merged representation of the given portion of the surrounding area of the SDC including statistical data of coverage of in-use objects present in the respective in-use image with LiDAR points of the in-use point cloud; determining, by the processor, for each in-use object present in the given portion of the surrounding area of the SDC, based on the statistical data, the plurality of enrichment features; generating, by the processor, based on the plurality of LiDAR features, the plurality of enrichment features associated with each in-use object present in the given portion of the surrounding area, an in-use feature vector; feeding, by the processor, the in-use feature vector to the MLA to determine the in-use degree of degradation of the in-use sensed data generated by the LiDAR sensor, the in-use degree of degradation being indicative of a current visibility distance at which the LiDAR sensor is capable of recognizing in-use objects in the given portion of the surrounding area of the SDC; and in response to the in-use degree of degradation of the in-use sensed data exceeding a predetermined image data degradation threshold, causing, by the processor, execution of at least one predetermined preventive action.

In some implementations of the method, the recognizing the in-use objects comprises recognizing in-use objects of a predetermined object class.

In some implementations of the method, the at least one predetermined preventive action comprises one of causing cleaning of the LiDAR sensor, generating a notification for maintenance of the LiDAR sensor, causing the SDC to decelerate, and causing the SDC to stop.

Further, in accordance with a second broad aspect of the present technology, there is provided a system for determining a degree of image data degradation of a LiDAR sensor of a Self-Driving Car (SDC) using a Machine-Learning Algorithm (MLA). the system comprises: a processor communicatively coupled to the LiDAR sensor; and a non-transitory computer-readable medium storing instructions. The processor, upon executing instructions, is configured to: receive, from the LiDAR sensor, training sensed data including a given training point cloud representative of a given portion of a surrounding area of the SDC; determine, based on the given training point cloud, a plurality of LiDAR features associated with the given portion of the surrounding area of the SDC; receive, from a camera sensor of the SDC, a respective training image representative of the given portion of the surrounding area of the SDC, the respective training image having been generated, by the camera sensor, at a same time as the training sensed data by the LiDAR sensor; project the given training point cloud onto the respective training image to generate a merged representation of the given portion of the surrounding area of the SDC including statistical data of coverage of training objects present in the respective image with LiDAR points; determine, for each training object present in the given portion of the surrounding area of the SDC, based on the statistical data, a plurality of enrichment features; receive, for the merged representation of the given portion, a respective label indicative of a degradation degree of the training sensed data generated by the LiDAR sensor; generate, based on the plurality of LiDAR features, the plurality of enrichment features associated with each training object present in the given portion of the surrounding area, and the respective label, a given training feature vector of a plurality of training feature vectors; train the MLA based on the plurality of training feature vectors to determine an in-use degree of degradation of image data of the LiDAR sensor representative of in-use objects in the surrounding area of the SDC.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high-power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR sensor in which the one or more objects may be detected. It is noted that the region of interest of the LiDAR sensor may be affected by various conditions such as but not limited to: an orientation of the LiDAR sensor (e.g. direction of an optical axis of the LiDAR sensor); a position of the LiDAR sensor with respect to the environment (e.g. distance above ground and adjacent topography and obstacles); operational parameters of the LiDAR sensor (e.g. emission power, computational settings, defined angles of operation), etc. The ROI of LiDAR sensor may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, net-books, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spread-sheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
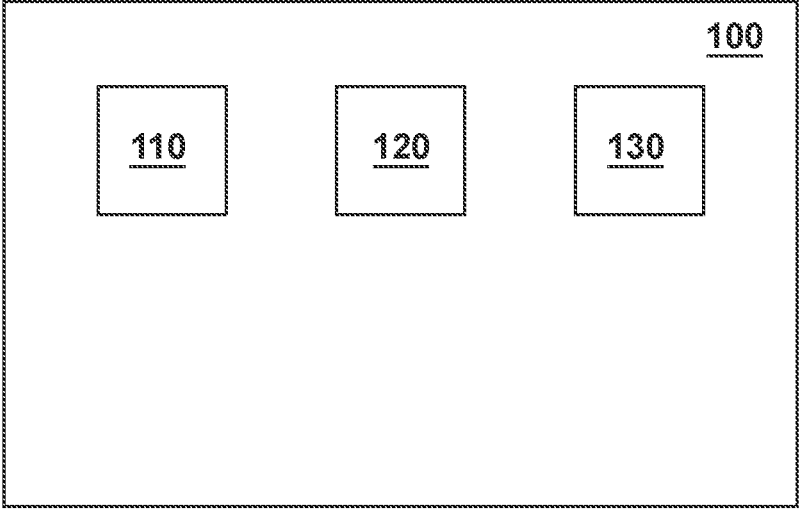
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
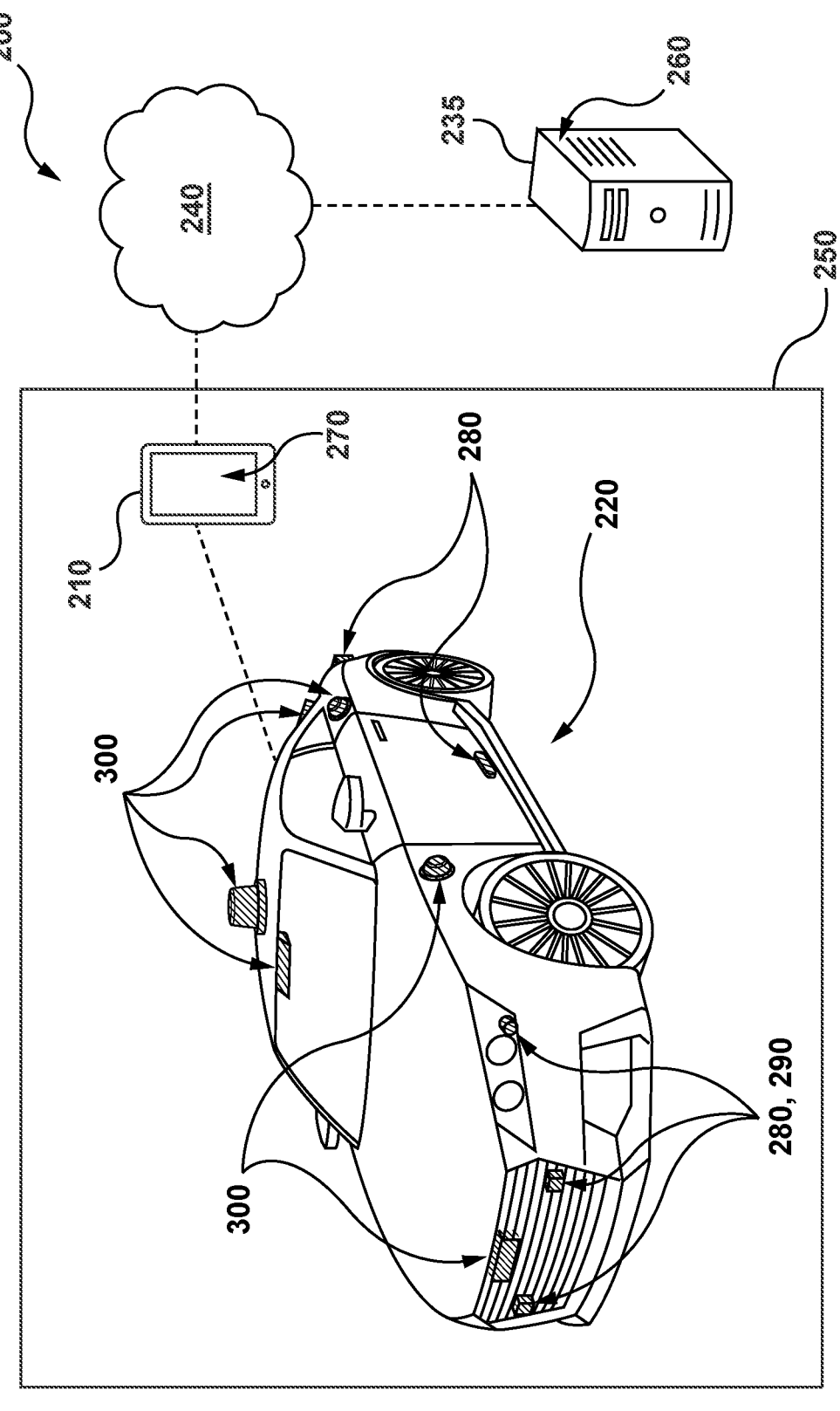
FIG. 2 depicts a networked computing environment being suitable for use with some implementations of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The environment 200 also includes a server 235 in communication with the electronic device 210 via a communication network 240 (e.g. the Internet or the like, as will be described in greater detail herein below).

In at least some non-limiting embodiments of the present technology, the electronic device 210 is communicatively coupled to control systems of the vehicle 220. The electronic device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an embodiment, the vehicle 220 could be a self-driving vehicle.

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including, for example: vehicle manufacturer, vehicle model, vehicle year of manufacture, vehicle weight, vehicle dimensions, vehicle weight distribution, vehicle surface area, vehicle height, drive train type (e.g., 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could thus include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not depicted).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210, such as a camera sensor 290. Broadly speaking, the camera sensor 290 may be configured to gather image data, such as images or a series thereof, about various portions of the surroundings 250 of the vehicle 220.

For example, in specific non-limiting embodiments of the present technology, the camera sensor 290 can be implemented as a mono camera with resolution sufficient to detect surrounding objects at a pre-determined distances of up to about 80 m (although camera systems with other resolutions and ranges are within the scope of the present disclosure) in the surroundings 250 of the vehicle 220. The camera sensor 290 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the camera sensor 290 can be mounted in a dedicated enclosure (not depicted) mounted on the top of the vehicle 220.

In some non-limiting embodiments of the present technology, the camera sensor 290 is configured to capture a pre-determine portion of the surroundings 250 around the vehicle 220. In some embodiments of the present technology, the camera sensor 290 is configured to capture the image data that represent approximately 90 degrees of the surroundings 250 around the vehicle 220 that are along a movement path of the vehicle 220.

In other non-limiting embodiments of the present technology, the camera sensor 290 is configured to capture an image (or a series of images) that represent approximately 180 degrees of the surroundings 250 around the vehicle 220 that are along a movement path of the vehicle 220. In yet other non-limiting embodiments of the present technology, the camera sensor 290 is configured to capture the image data that represent approximately 360 degrees of the surroundings 250 around the vehicle 220 that are along a movement path of the vehicle 220 (in other words, the entirety of the surrounding area around the vehicle 220).

In a specific non-limiting example, the camera sensor 290 can be implemented as the camera of a type available from FLIR INTEGRATED IMAGING SOLUTIONS INC., 12051 Riverside Way, Richmond, BC, V6W 1K7, Canada. It should be expressly understood that the camera sensor 290 can be implemented in any other suitable equipment.

In some cases, the image data provided by the camera sensor 290 could be used by the electronic device 210 for performing object detection procedures. For example, the electronic device 210 could be configured to feed the image data provided by the camera sensor 290 to an Object Detection Neural Network (ODNN) that has been trained to localize and classify potential surrounding objects in the surroundings 250 of the vehicle 220.

In another example, the plurality of sensor systems 280 could include one or more radar-type sensor systems (not separately labelled) that are mounted to the vehicle 220 and communicatively coupled to the processor 110 of the electronic device 210. Broadly speaking, the one or more radar-type sensor systems may be configured to make use of radio waves to gather data about various portions of the surroundings 250 of the vehicle 220. For example, the one or more radar-type sensor systems may be configured to gather radar data about potential surrounding objects around the vehicle 220, such data potentially being representative of a distance of surrounding objects from the radar-type sensor system, orientation of surrounding objects, velocity and/or speed of surrounding objects, and the like.

It should be noted that the plurality of sensor systems 280 could include additional types of sensor systems to those non-exhaustively described above and without departing from the scope of the present technology.

For example, according to certain non-limiting embodiments of the present technology and as is illustrated in FIG. 2, the vehicle 220 can be equipped with at least one Light Detection and Ranging (LiDAR) system, such as a LiDAR sensor 300, for gathering information about surroundings 250 of the vehicle 220. While only described herein in the context of being attached to the vehicle 220, it is also contemplated that the LiDAR sensor 300 could be a stand-alone operation or connected to another system.

According to non-limiting embodiments of the present technology, the LiDAR sensor 300 of the vehicle 220 is communicatively coupled to the electronic device 210. In some non-limiting embodiments, information received by the electronic device 210 from the LiDAR sensor 300 could be used, at least in part, in controlling the vehicle 220. For example, in embodiments where the vehicle 220 is a self-driving vehicle, 3D maps created based on information determined by the LiDAR sensor 300 could be used by the electronic device 210 to control, at least in part, the vehicle 220. In another example, the processor 110 of the electronic device 210 can be configured to use the information received by the LiDAR sensor 300 for real-time detection of surrounding objects present in the surroundings 250 of the vehicle 220 for generating and/or amending a movement trajectory of the vehicle 220.

In accordance with certain non-limiting embodiments of the present technology, a given surrounding object can comprise at least one of a moving surrounding object and a stationary surrounding object. For example, a moving surrounding object can include, without limitation, another vehicle, a train, a tram, a cyclist, or a pedestrian. A stationary surrounding object can include, without limitation, a traffic light, a road post, a streetlamp, a curb, a tree, a fire hydrant, a stopped or parked vehicle, and a litter bin, as an example.

It is expected that a person skilled in the art will understand the functionality of the LiDAR sensor 300, but briefly speaking, a light source (such as a laser, not depicted) of the LiDAR sensor 300 is configured to send out light beams that, after having reflected off one or more surrounding objects in the surroundings 250 of the vehicle 220, are scattered back to a receiver (not depicted) of the LiDAR sensor 300. The photons that come back to the receiver are collected with a telescope and counted as a function of time. Using the speed of light ($\sim 3 \times 10^8$ m/s), the processor 110 of the electronic device 210 can then calculate how far the photons have traveled (in the round trip). Photons can be scattered back off of many different entities surrounding the vehicle 220, such as other particles (aerosols or molecules) of water, dust, or smoke in the atmosphere, other vehicles, stationary surrounding objects or potential obstructions in front of the vehicle 220.

Depending on the embodiment, the vehicle 220 could include more or fewer LiDAR sensor 300 than illustrated. Depending on the particular embodiment, choice of inclusion of particular ones of the plurality of sensor systems 280 could depend on the particular embodiment of the LiDAR sensor 300. The LiDAR sensor 300 could be mounted, or retrofitted, to the vehicle 220 in a variety of locations and/or in a variety of configurations.

For example, depending on the implementation of the vehicle 220 and the LiDAR sensor 300, the LiDAR sensor 300 could be mounted on an interior, upper portion of a windshield of the vehicle 220. Nevertheless, as illustrated in FIG. 2, other locations for mounting the LiDAR sensor 300 are within the scope of the present disclosure, including on a back window, side windows, front hood, rooftop, front grill, front bumper or the side of the vehicle 220. In some cases, the LiDAR sensor 300 can even be mounted in a dedicated enclosure mounted on the top of the vehicle 220.

In some non-limiting embodiments of the present technology, such as that of FIG. 2, the LiDAR sensor 300 is mounted to the rooftop of the vehicle 220 in a rotatable configuration. For example, the LiDAR sensor 300 mounted to the vehicle 220 in a rotatable configuration could include at least some components that are rotatable 360 degrees about an axis of rotation of the given LiDAR sensor 300. When mounted in rotatable configurations, the given LiDAR sensor 300 could gather data about most of the portions of the surroundings 250 of the vehicle 220.

In some non-limiting embodiments of the present technology, such as that of FIG. 2, the LiDAR sensor 300 is mounted to the side, or the front grill, for example, in a non-rotatable configuration. For example, the LiDAR sensor 300 mounted to the vehicle 220 in a non-rotatable configuration could include at least some components that are not rotatable 360 degrees and are configured to gather data about pre-determined portions of the surroundings 250 of the vehicle 220.

Irrespective of the specific location and/or the specific configuration of the LiDAR sensor 300, it is configured to capture data about the surroundings 250 of the vehicle 220 used, for example, for building a multi-dimensional map of surrounding objects in the surroundings 250 of the vehicle 220. Details relating to the configuration of the LiDAR sensor 300 to capture the data about the surroundings 250 of the vehicle 220 will now be described.

In a specific non-limiting example, the LiDAR sensor 300 can be implemented as the LiDAR based sensor that may be of the type available from VELODYNE LiDAR, INC. of 5521 Hellyer Avenue, San Jose, CA 95138, United States of America. It should be expressly understood that the LiDAR sensor 300 can be implemented in any other suitable equipment.

It should be noted that although in the description provided herein the LiDAR sensor 300 is implemented as a Time of Flight LiDAR system—and as such, includes respective components suitable for such implementation thereof—other implementations of the LiDAR sensor 300 are also possible without departing from the scope of the present technology. For example, in certain non-limiting embodiments of the present technology, the LiDAR sensor 300 may also be implemented as a Frequency-Modulated Continuous Wave (FMCW) LiDAR system according to one or more implementation variants and based on respective components thereof as disclosed in a co-owned United States Patent Application Publication No.: 2021/373,172-A1 published on Dec. 2, 2021, and entitled "LiDAR DETECTION METHODS AND SYSTEMS"; the content of which is hereby incorporated by reference in its entirety.

Figure 3:
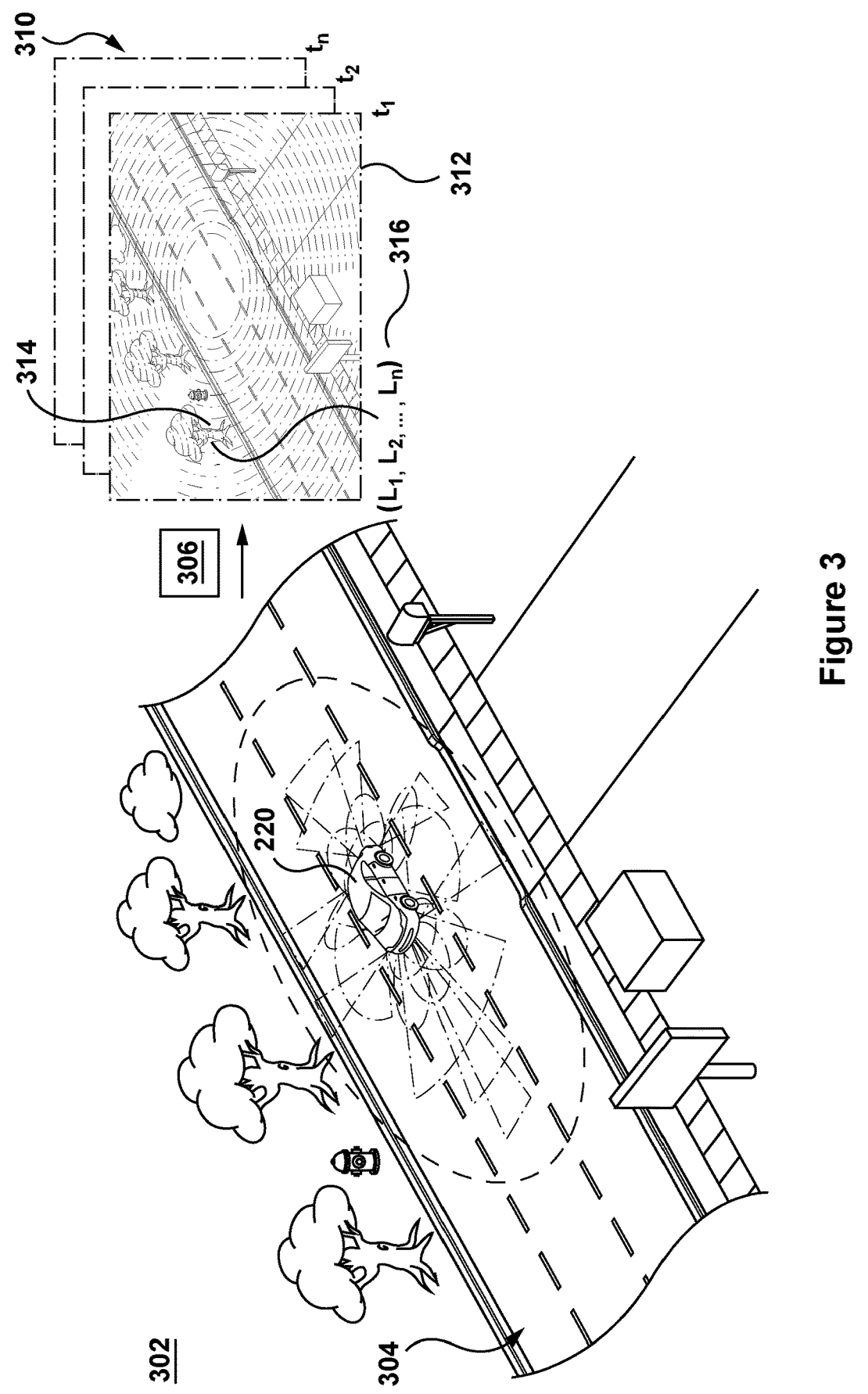
FIG. 3 depicts a LIDAR data acquisition procedure executed by a processor of an electronic device of the networked computing environment of FIG. 2, the procedure for receiving a 3D point cloud data captured by a LiDAR sensor of a vehicle present in the networked computing environment of FIG. 2, in accordance with certain non-limiting embodiments of the present technology.

With reference to FIG. 3, there is depicted a schematic diagram of a LiDAR data acquisition procedure 302, executed by the processor 110 of the electronic device 210, for generating a 3D point cloud data 310 representative of surrounding object present in the surroundings 250 of the vehicle 220, in accordance with certain non-limiting embodiments of the present technology.

In some non-limiting embodiments of the present technology, the LiDAR data acquisition procedure 302 of receiving the 3D point cloud data 310 can be executed in a continuous manner. In other embodiments of the present technology, the LiDAR data acquisition procedure 302 of receiving the 3D point cloud data 310 can be implemented at pre-determined intervals, such every 2 milliseconds or any other suitable time interval.

To execute the LiDAR data acquisition procedure 302, as the vehicle 220 travels on a road 304, the processor 110 of the electronic device 210 is configured to acquire, with the LiDAR sensor 300, sensor data 306 representative of the objects in the surrounding area 250 of the vehicle 220. According to certain non-limiting embodiments of the present technology, the processor 110 can be configured to receive the sensor data 306 representative of the objects in the surrounding area 250 of the vehicle 220 at different locations on the road 304 in a form one or more 3D point clouds, such as a 3D point cloud 312.

Generally speaking, the 3D point cloud 312 is a set of LiDAR points in the form of a 3D point cloud, where a given LiDAR point 314 is a point in 3D space indicative of at least a portion of a surface of a given surrounding object on or around the road 304. In some non-limiting embodiments of the present technology, the 3D point cloud 312 may be organized in layers, where points in each layer are also organized in an elliptical fashion and the starting points of all elliptical layers are considered to share a similar orientation.

The given LiDAR point 314 in the 3D point cloud 312 is associated with LiDAR parameters 316 (depicted in FIG. 3 as $L_1$, $L_2$, and $L_N$). As a non-limiting example, the LiDAR parameters 316 may include: distance, intensity, and angle, as well as other parameters relating to information that may be acquired by the LiDAR sensor 300. The LiDAR sensor 300 may acquire a 3D point cloud at each time step t while the vehicle 220 is travelling, thereby acquiring a set of similar 3D point clouds of the 3D point cloud data 310 about the surroundings 250 of the vehicle 220.

It is contemplated that in some non-limiting embodiments of the present technology, the processor 110 of the electronic device 210 can be configured to enrich the 3D point cloud 312 with the image data obtained from the camera sensor 290. To that end, the processor 110 can be configured to apply one or more approaches described in a co-owned United States Patent Application Publication No.: 2020/090, 352-A1, published on Mar. 19, 2020, and entitled "METH-ODS AND SYSTEMS FOR COMPUTER-BASED DETERMINING OF PRESENCE OF OBJECTS"; the content of which is hereby incorporated by reference in its entirety.

However, certain factors may weaken, at least partially, the ability of the LiDAR sensor 300 to generate the 3D point clouds of desired quality as the vehicle 220 is travelling down the road 304. For example, an exit window (not separately depicted) of the LiDAR sensor 300 can get contaminated, such as with dirt or dust while the vehicle 220 is travelling on the road 304. In another example, a field of view of the LiDAR sensor 300 can, at least partially, be obscured as a result of certain weather conditions, such as fog, rain, or snow. Other factors that can impair "vision" of the LiDAR sensor 300 include, without limitation, smoke, background light noise, such as from the Sun, and the like.

As a result, the LiDAR sensor 300 may not be able to output a same amount of light towards the surroundings 250; and thus, would not be able to receive a same number of LiDAR points therefrom, causing degradation to the 3D point cloud data 310. Without taking preventive actions, such as cleaning and/or servicing the LiDAR sensor 300, as an example, the vehicle 220 can stop receiving adequate data of the surroundings 250, which may result in collisions with surrounding objects therein causing, for example, car accidents.

Figure 4:
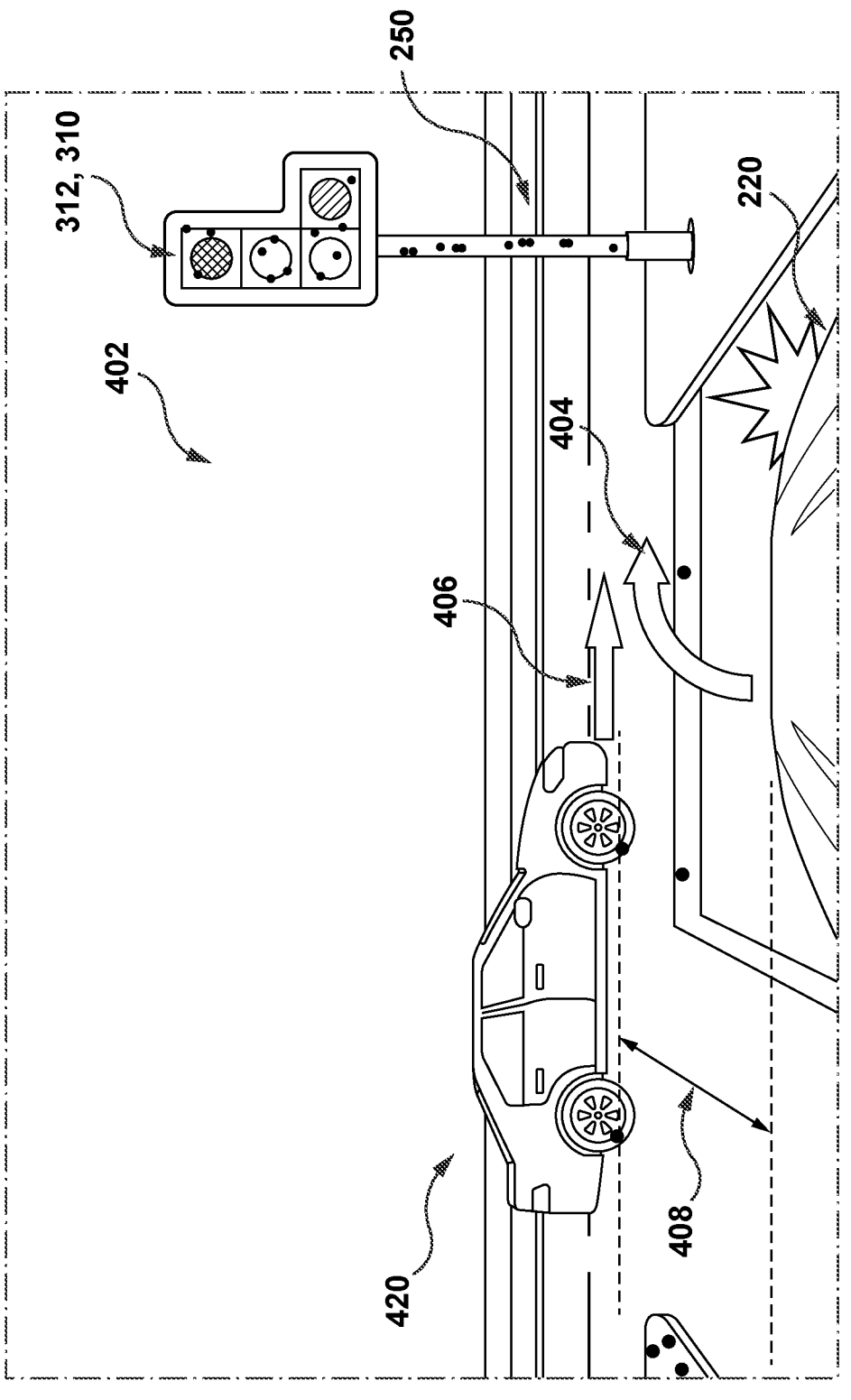
FIG. 4 depicts a schematic diagram of the vehicle present in the networked computing environment of FIG. 2 driving within a given road section, the given road section being represented by the 3D point cloud data that has been received by the processor of the networked computing environment of FIG. 2 executing the LIDAR data acquisition procedure of FIG. 3, in accordance with certain non-limiting embodiments of the present technology.

With reference to FIG. 4, there is depicted a schematic diagram of the vehicle 220 driving within a given road section 402, in accordance with certain non-limiting embodiments of the present technology.

As it can be appreciated, as the vehicle 220 approaches an intersection in the given road section 402, it may be configured, according to a predetermined movement trajectory thereof, to make a right maneuver 404 to an intersecting road. However, due to one of the factor non-exhaustively listed above, the 3D point cloud 312 may not include LiDAR points representative of surrounding objects positioned, in the surroundings 250, at a distance over a first distance 408 from the vehicle 220—such as an upcoming vehicle 420 driving down the intersecting road in a straight direction 406.

Thus, the so degraded data provided by the 3D point cloud 312 may not allow the vehicle 220 to consider the upcoming vehicle 420 on the intersecting road and make the right maneuver 404 without yielding to the upcoming vehicle 420, which may cause a collision therewith.

Thus, developers of the present technology have devised the present methods and systems for determining a degree of degradation of LiDAR data generated by the LiDAR sensor 300, such as the 3D point cloud data 310 including the 3D point cloud 312 representative of the surroundings 250 of the vehicle 220 based on data generated by other sensors installed within the vehicle 220, such as the camera sensor 290.

As used herein, the degree of LiDAR data degradation is a measure indicative of a maximum distance from the vehicle 220 at which the LiDAR sensor 300 can reliably detect a surrounding object—that is, receive a sufficient amount of light scattered therefrom to generate LiDAR points representative thereof. By way of example, if the LiDAR sensor 300 can recognize surrounding objects, in the given portion of the surroundings 250 of the vehicle 220, only within a distance range from 0 to 30 m, the degree of degradation can be considered to be high. Further, if the LiDAR sensor 300 can recognize surrounding objects within a distance range from 0 to 50 m, the degree of degradation of the 3D point cloud data 310 can be considered to be moderate. Finally, if the LiDAR sensor 300 can recognize surrounding objects within a distance range from 0 to 80 m, as an example, the degree of degradation of the 3D point could data 310 can be considered low.

In this regard, the developers have appreciated that the degree of degradation can be determined based on coverage statistical data of surrounding objects, present in a given portion of the surroundings 250 of the vehicle 220, with LiDAR points—such as the upcoming vehicle 420 in the given road section 402. To that end, as will become apparent from the description provided below, the coverage statistical data can be determined by projecting a 3D point cloud representative of the given portion of the surroundings 250, such as the 3D point cloud 312 representative of the given road section 402, onto an image, representative of the same given portion of the surroundings 250, taken by the camera sensor 290 at a same time as the 3D point cloud 312. Thus, according to certain non-limiting embodiments of the present technology, as will be described in greater detail further below, the coverage statistical data can be based on a number and parameters of LiDAR points having fallen within a respective 2D representation of the given surrounding object present in the image from the camera sensor 290.

Further, referring back to FIG. 2, based at least on the so determined coverage statistical data of the surrounding objects, the present methods are further directed to training a machine learning algorithm (MLA) 260 hosted by the server 235 to determine the degree of degradation.

In the non-limiting embodiments of the present technology, the MLA 260 may be based on neural networks (NN), such as convolutional NN (CNN), Transformer-based NN, and the like. However, in some non-limiting embodiments of the present technology, the MLA 260 can be implemented based on a decision tree model.

Machine-Learning Model Architecture

Figure 5:
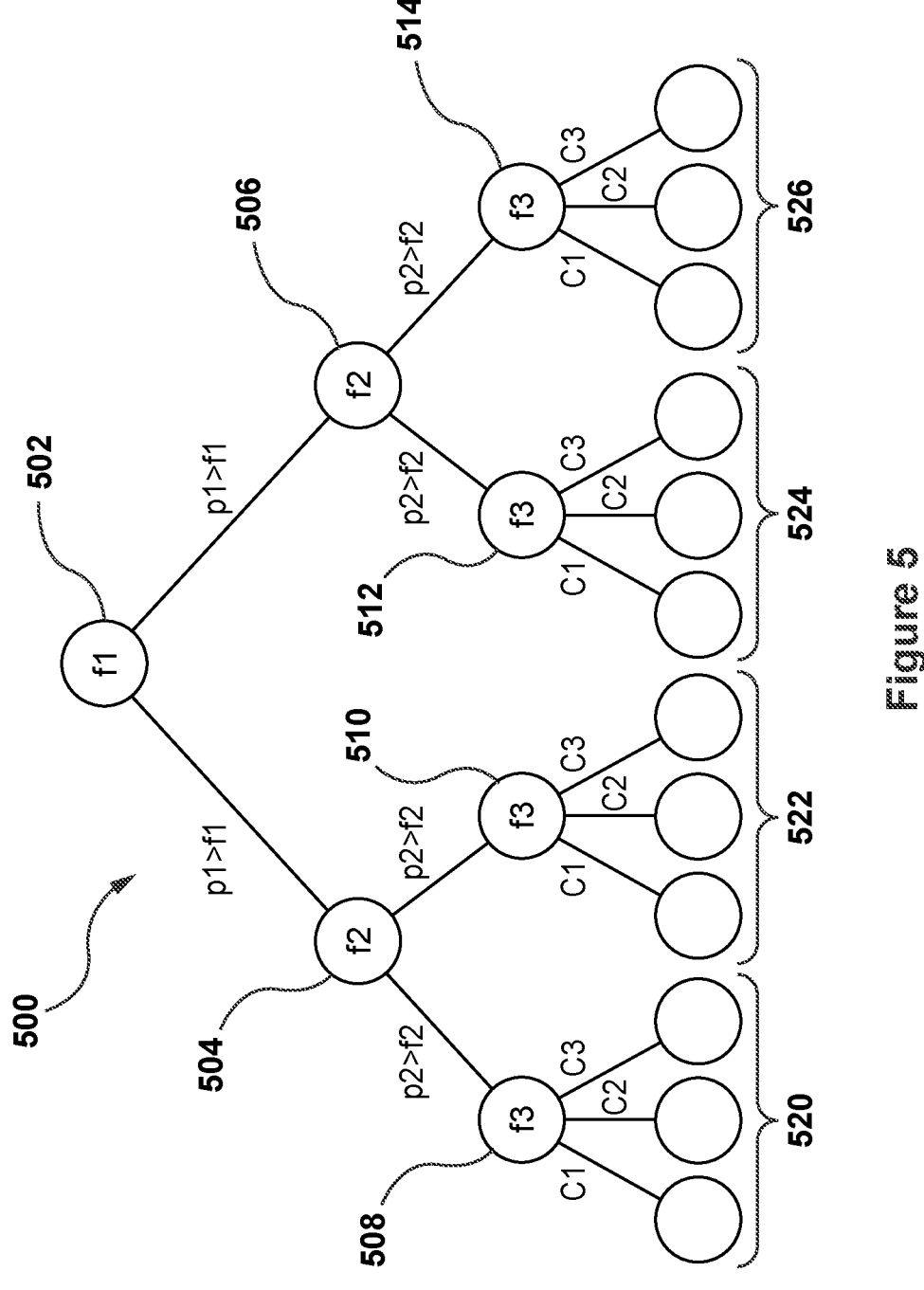
FIG. 5 depicts a schematic diagram of a machine-learning model architecture used for implementation at least some non-limiting embodiments of the present technology.

With reference to FIG. 5, there is depicted a schematic diagram of a decision tree model 500 that can be used with at least some non-limiting embodiments of the present technology. The decision tree model 500 aims at illustrating a generic decision tree model which may be modified so as to meet the requirements of a specific prediction model, such as then MLA 260. Such modifications may include, for example but without being limitative, adding or removing one or more level of the tree, adding or removing nodes (i.e., features and the associated splits), adding or removing branches connecting the nodes and/or the leaves of the tree.

The decision tree model 500 may be a trained tree model. In some embodiments, the decision tree model 500 may, once generated, be updated and/or modified to improve, for example, a level of accuracy of the machine-learning model and/or a scope of application of the machine-learning model. In some embodiments, the decision tree model 500 may be relied upon to determine, for example, but without being limited to, the degree of data degradation of the LiDAR sensor 300, as will be described below. Other fields in which the decision tree model 500 may be relied upon may also be envisioned without departing from the scope of the present technology.

The decision tree model 500 comprises a first node 502 associated with a first feature "f1". The first node 502 defines a first level of the decision tree model 500. The first node 502 is connected through branches to a second node 504 and a third node 506. The second node 504 and the third node 506 are both associated with a second feature "f2". The second node 504 and the third node 506 define a second level of the decision tree model 500. In an embodiment, the first feature "f1" and the split for the first feature "f1" have been selected amongst a set of features to be positioned at a first level of the model tree 500 on the basis of a plurality of training digital objects. For example, a given feature may characterize a given LiDAR point of a training 3D point cloud generated by the LiDAR sensor 300, as will be described in a greater detail below.

The first feature "f1" is defined so that, for a given digital object, a value of a parameter associated with the first feature "f1" determines whether the digital object is to be associated with the second node 504 or the third node 506. As an example, if the value is less than a value "f1" then the digital object is associated with the second node 504. As another example, if the value is more than the value "f1" then the digital object is associated with the third node 506.

In turn, the second node 504 is associated with a fourth node 508 associated with a third feature "f3" and a fifth node 510 associated with the third feature "f3". The third node 506 is associated with a sixth node 512 associated with the third feature "f3" and a seventh node 514 associated with the third feature "f3". The fourth node 508, the fifth node 510, the sixth node 512 and the seventh node 514 define a third level of the decision tree model 500. As previously described in connection with the first node 502, for a given digital object, a value of a parameter associated with the second feature "f2" determines whether the digital object is to be associated with the fourth node 508 or the fifth node 510 (if the digital object is associated with the second node 504) or the sixth node 512 or the seventh node 514 (if the digital object is associated with the third node 506).

In turn, each one of the fourth node 508, the fifth node 510, the sixth node 512 and the seventh node 514 are associated with sets of predicted parameters. In the example illustrated at FIG. 5, the sets of predicted parameters comprise a first set 520, a second set 522, a third set 524 and a fourth set 526. Each one of the sets of predicted parameters comprises three targets, namely "C1", "C2" and "C3", provided, for example, by human assessors, as will become apparent from the description provided below.

As a person skilled in the art of the present technology may appreciate, the decision tree model 500 illustrates an embodiment wherein a particular level of the decision tree model 500 is associated with one feature. In the example of FIG. 5, a first level comprises the first node 502 and is associated with the first feature "f1"; a second level comprises the second node 504 and the third node 506 and is associated with the second feature "f2"; and a third level comprises the fourth node 508, the fifth node 510, the sixth node 512 and the seventh node 514 and is associated with the third feature "f3".

In other words, in the embodiment of FIG. 5, the first level is associated with the first feature "f1", the second level is associated with the second feature "f2" and the third level is associated with the third feature "f3". Other embodiments may however be envisioned. In particular, an alternative embodiment wherein a generated tree model may include distinct features for a given level of the tree model. For example, a first level of such tree model may comprise a first node associated with a first feature "f1", a second level may comprise a second node associated with a second feature "f2" and a third node associated with a third feature "f3". As a person skilled in the art of the present technology may appreciate, other variations as to which features may be associated with a given level may be envisioned without departing from the scope of the present technology.

Further, how the features, such as the first feature "f1", the second feature "f2", and the third feature "f3", have been selected for generating the decision tree model 500 is not limited. In some non-limiting embodiments of the present technology, selecting the features and thus associated splits between nodes of the decision tree model 500 can include optimizing a respective metric indicative of quality of a given feature to separate, along branches of the decision tree model 500, the plurality of training digital objects, during a training process, as each one of the plurality of training digital objects is fed to the decision tree model 500. In some non-limiting embodiments of the present technology, such a metric can include, without limitation, an Estimate of Positive Correctness metric, a Gini Impurity metric, an Information Gain metric, and the like. In specific non-limiting embodiments of the present technology, the features can be selected based on maximizing a prediction quality parameter of proto-trees making up the decision tree model 500, as described, for example, in a United States Patent Application Publication No.: 2019/164,084-A1, published on May 30, 2019, and entitled "METHOD OF AND SYSTEM FOR GENERATING PREDICTION QUALITY PARAMETER FOR A PREDICTION MODEL EXECUTED IN A MACHINE LEARNING ALGORITHM", content of which is incorporated herein by reference in its entirety.

Further, according to certain non-limiting embodiments of the present technology, the MLA 260 may comprise a single instance of the decision tree model 500, in which case the MLA can be referred to as a single decision tree. However, in other non-limiting embodiments of the present technology, the MLA 260 can include an ensemble of decision trees implemented similarly to the decision tree model 500, in which case the MLA 260 can be referred to as a forest of decision trees. In this case, a final prediction of the ensemble of decision trees is based on prediction outcomes of each decision tree of the ensemble. How the ensemble of decision trees can be built is not limited, and may include, for example, using a boosting approach, such as a gradient boosting approach.

Generally speaking, the boosting is a method of building the ensemble of decision trees, where the trees are build in a stage-wise manner (as opposed to generating a random forest, as an example, where trees can be generated in parallel) such that a difference between targets and prediction outputs of the ensemble of decision trees is minimized, at each iteration, with generating each new decision tree thereof. The difference between the targets and the prediction outcomes of the ensemble of decision trees can be expressed, for example, by a loss function, such as a Cross-Entropy Loss Function.

It should be expressly understood that other implementations of the loss function are also envisioned by the non-limiting embodiments of the present technology and may include, by way of example, and not as a limitation, a Mean Squared Error Loss function, a Huber Loss function, a Hinge Loss function, and others.

In other words, by applying the boosting approach, the MLA 260 uses decision trees as week learners, which the MLA 260 sequentially combines in a way that each new learner fits to residuals from a previous iteration, thereby improving an aggregate outcome of the whole ensemble of decision trees. Put another way, each decision tree is built on the same plurality of training digital objects, however training digital objects, in which the first decision tree made "mistakes" in predicting are prioritized when building the decision second tree, etc. Further, the MLA 260 aggregates results from each iteration forming a strong learner.

In specific non-limiting embodiments of the present technology, the MLA 260 can comprise a CatBoost ensemble of decision trees, as described, for example, in an article "*CatBoost: gradient boosting with categorical features support*" by Dorogush et al., and published by YANDEX INC., content of which is incorporated herein by reference in its entirety.

Thus, generally speaking, the processor of the server 235 and/or the electronic device 210 can be said to be executing two respective processes in respect of the MLA 260. A first process of the two processes is a training process, where the processor 110, for example, of the server 235 is configured to train the MLA 260, based on the plurality of training digital objects (also referred to herein as a "training set of data"), to determine the degree of degradation provided by the LiDAR sensor 300, such as the 3D point cloud 312 of the given road section 402. The training process will be described in detail below with reference to FIGS. 6 to 7.

A second process is an in-use process, where the processor 110, for example, of the electronic device 210, executes the so-trained MLA 260 for determining the degree of degradation of the 3D point cloud 312, in accordance with the non-limiting embodiments of the present technology. The in-use process will be described in detail below with reference to FIG. 8.

According to the non-limiting embodiments of the present technology, both the training process and the in-use process may be executed by the server 235 and/or the processor 110 of the electronic device 210 in the networked computing environment 200 described hereinabove.

Training Process

As mentioned above, the MLA 260 can be trained based on the plurality of training digital objects. According to certain non-limiting embodiments of the present technology, the given training digital object includes: (i) a respective training feature vector including features representative of the given portion of the surroundings 250 of the vehicle 220 (such as a training road section 602 schematically depicted in FIG. 6) determined based at least in part on training 3D point cloud data generated by the LiDAR sensor 300; and (ii) a label indicative of a degree of degradation of the training 3D point cloud data.

According to certain non-limiting embodiments of the present technology, the respective training feature vector for the training road section 602 can include, for the given portion of the surroundings 250: (i) a plurality of LiDAR features associated with LiDAR points representative of the given portion; and (ii) features indicative of statistical data of coverage of training surrounding objects present in the given portion of the surroundings 250 with LiDAR points. How these both types of features making up the respective training feature vector associated with the given training digital object can be determined, in accordance with certain non-limiting embodiments of the present technology, will now be described.

Figure 6:
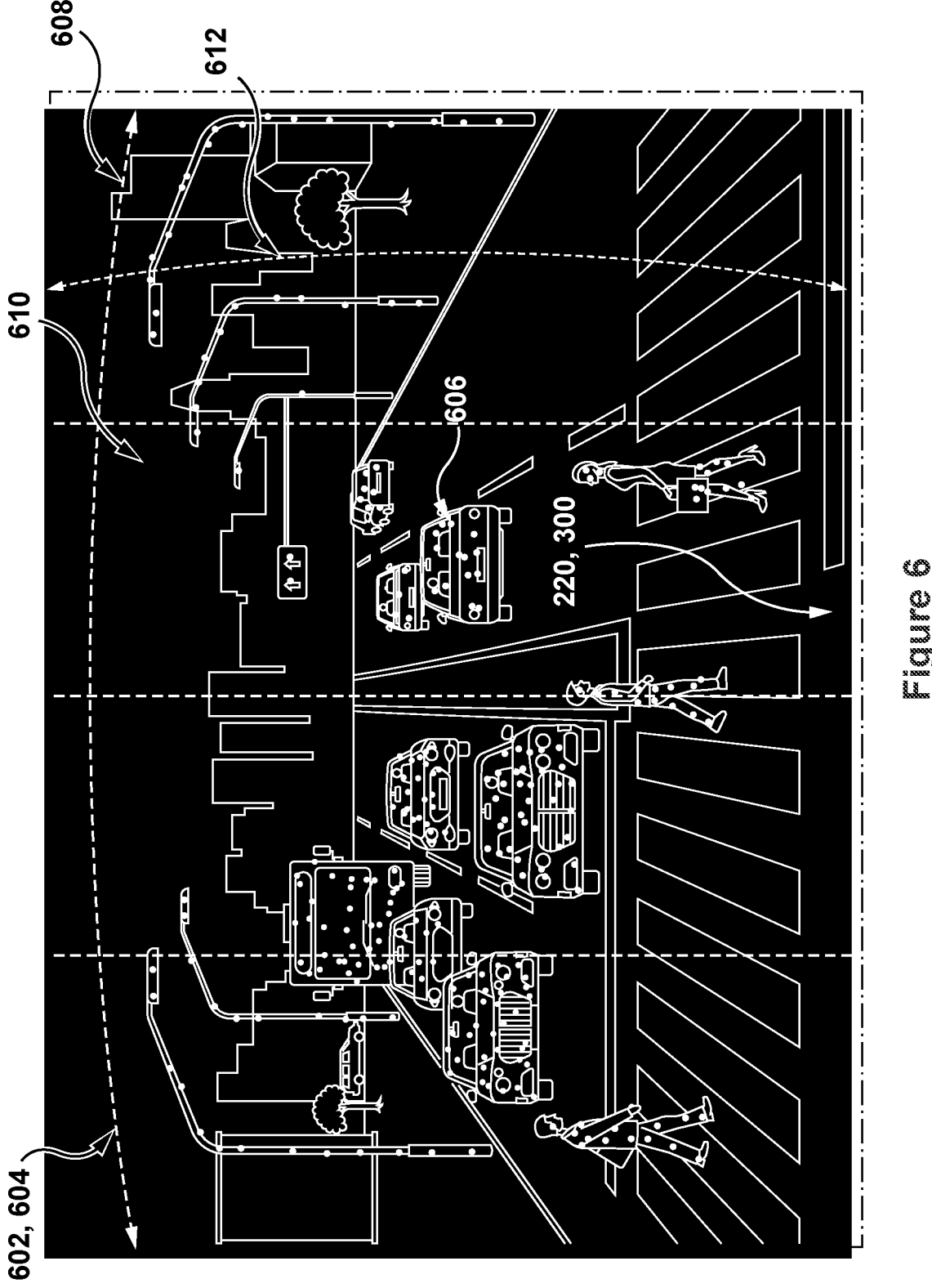
FIG. 6 depicts a schematic diagram of a training road section as perceived from a point of view of the LiDAR sensor of the vehicle present in the networked computing environment of FIG. 2, the training road section being represented by a training 3D point cloud, used by the processor of the networked computing environment of FIG. 2 for determining a plurality of LiDAR features associated with the given training portion for generating a training set of data for training a machine-learning algorithm (MLA) to determine a degree of degradation of the 3D point cloud data of FIG. 4, in accordance with certain non-limiting embodiments of the present technology.

With reference to FIG. 6, there is depicted a schematic diagram of the training road section 602 as perceived from a point of view of the LiDAR sensor 300 of the vehicle 220 for determining, by the processor 110, the plurality of LiDAR features of a training 3D point cloud 604 representative of the training road section 602, in accordance with certain non-limiting embodiments of the present technology.

According to certain non-limiting embodiments of the present technology, the plurality of LiDAR features of the training 3D point cloud 604, includes, without limitation, (i) a total number of LiDAR points of the training point cloud 604; and (ii) light intensity values of each LiDAR point of the training 3D point cloud 604, such as a given training LiDAR point 606. However, it should be noted that the above LiDAR features are non-exhaustive, and in some non-limiting embodiments of the present technology, the plurality of LiDAR features of the training 3D point cloud 604 may include other LiDAR features, such as a colour of the given training LiDAR point 606, a distance, from the LiDAR sensor 300, to the given training LiDAR point 606, and the like.

However, in other non-limiting embodiments of the present technology, the processor 110 can be configured to determine the plurality of LiDAR features within a predefined portion of the training 3D point cloud 604. For example, the processor 110 can be configured to define, along a horizontal filed of view (HFOV) 608, corresponding to a width of the training road section 602, a plurality of HFOV angles 608, such as a given HFOV angle 610. It is not limited how the processor 110 can be configured to define the plurality of HFOV angles, and in some non-limiting embodiments of the present technology, the processor 110 can be configured to define the plurality of HFOV angles uniformly within the HFOV 608 of the LiDAR sensor 300, based on a predetermined number of the plurality of HFOV angles. However, in other non-limiting embodiments of the present, the processor 110 can be configured to define wider HFOV angles on edges of the HFOV 608 and narrower intermediates HFOV angles of the plurality of HFOV angles.

Further, according to certain non-limiting embodiments of the present technology, the processor 110 can be configured to determine the plurality of LiDAR features for each one of the plurality of HFOV angles. More specifically, the processor 110 can be configured to determine, for example, (i) a respective total number of LiDAR points of the training point cloud 604 having fallen within the given HFOV angle 610; and (ii) respective light intensity values of each LiDAR point within the given HFOV angle 610.

In some non-limiting embodiments of the present technology, having determined the plurality of LiDAR features, the processor 110 can be configured to store it in a form of a vector, such as:

$$\{ \dots ,[N_i,( \dots ,I_{ij}, \dots )], \dots \}, \qquad \text{(Equation 1)}$$

where $N_i$ is the respective total number of LiDAR points of the training point cloud 604 having fallen within the given HFOV angle 610; and $I_{ij}$ is a respective light intensity values of the given LiDAR point 606 having fallen within the given HFOV angle 610.

In additional non-limiting embodiments of the present technology, the processor 110 can further be configured to determine the plurality of LiDAR features within other portions of the field of view (FOV) of the LiDAR sensor 300. For example, similar to defining the plurality of HFOV angles, the processor 110 can be configured to define, along a vertical field of view (VFOV) 612 of the LiDAR sensor 300, corresponding to a height of the training road section 602, a plurality of VFOV angles including, for example, 4, 16, or 32 VFOV angles. It is also not limited how the processor 110 can be configured to define the plurality of VFOV angles and may include, for example, defining the plurality of VFOV angles uniformly within the VFOV 612 of the LiDAR sensor 300. Further, the processor 110 can be configured to determine the plurality of LiDAR features for each one of the plurality of VFOV angles, similar as described above with respect to determining the LiDAR features of the given HFOV angle 610.

In yet additional non-limiting embodiments of the present technology, the processor 110 can further be configured to define portions (not depicted) of the FOV of the LiDAR sensor 300 corresponding to certain distance ranges therefrom within the surroundings 250 of the vehicle 220. For example, the processor 110 can be configured to define: (i) a first portion of the FOV corresponding to the distance range form 0 to 30 m from the LiDAR sensor 300; (ii) a second portion of the FOV corresponding to the distance range form 30 to 50 m from the LiDAR sensor 300; (iii) a third portion of the FOV corresponding to the distance range form 50 to 80 m from the LiDAR sensor 300; and (iv) a fourth portion of the FOV corresponding to the distance range form 80 m and above from the LiDAR sensor 300. Further, the processor 110 can be configured to determine the plurality of LiDAR features for each of the so defined portions of the FOV of the LiDAR sensor 300, similar as described above with respect to determining the LiDAR features of the given HFOV angle 610. It should be expressly understood that other fashions of defining portions within the FOV of the LiDAR sensor 300 can also be envisioned without departing from the scope of the present technology.

Further, as it can be appreciated, the processor 110 can be configured to store the plurality of LiDAR feature for each of the so defined portions of the FOV of the LiDAR sensor 300 in the vector expressed by Equation 1 for further use in generating the given training digital object of the plurality of training digital objects for training the MLA 260.

Further, according to certain non-limiting embodiments of the present technology, the processor 110 can be configured to determine the features indicative of the statistical data of coverage of the training surrounding objects present in the given portion of the surroundings 250 of the vehicle 220, such as the training road section 602. To that end, the processor 110 can be configured to project each LiDAR point of the training 3D point cloud 604 onto an image representative of the training road section 602, such as a training image 704 generated, for example, by the camera sensor 290.

Figure 7:
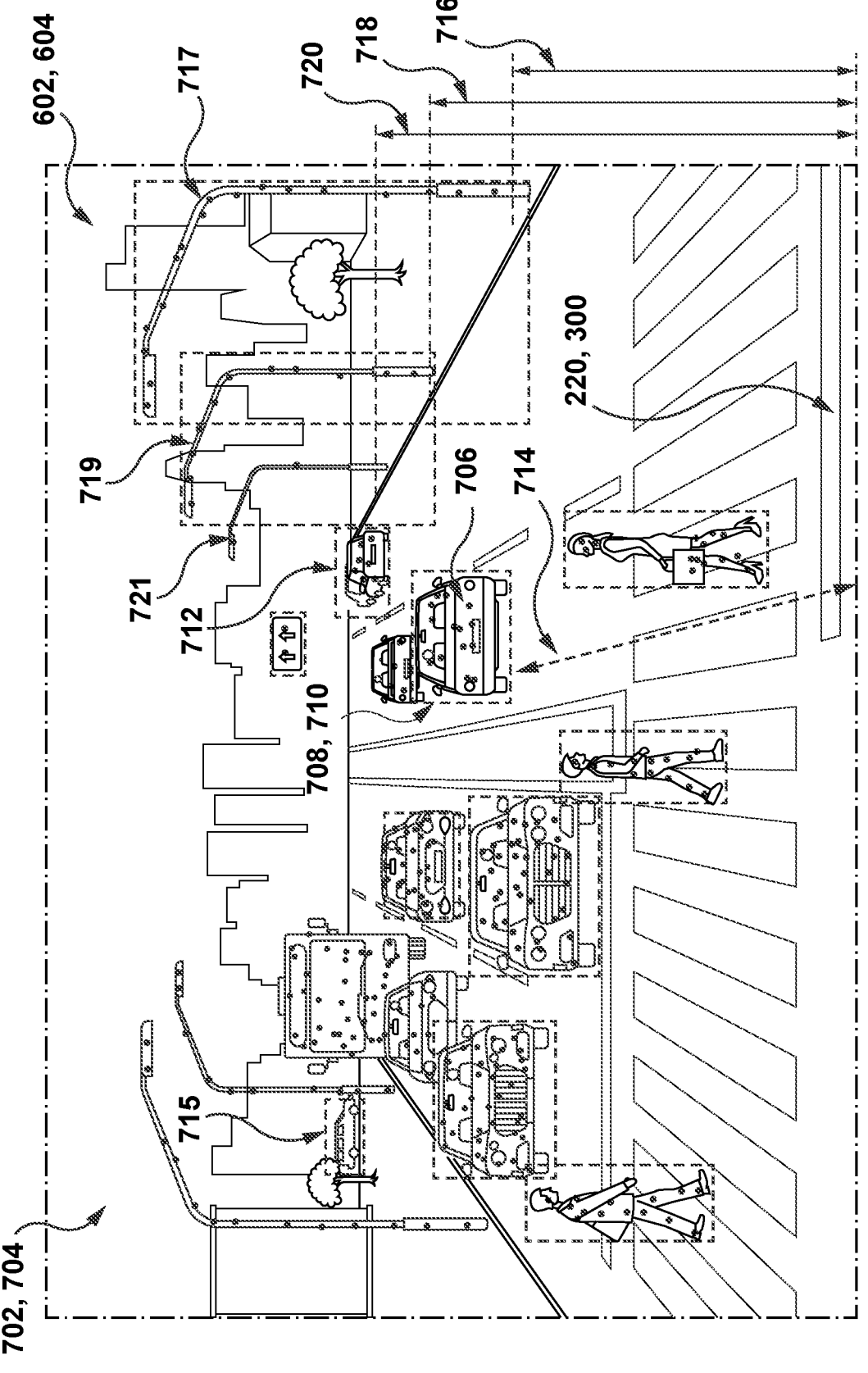
FIG. 7 depicts a schematic diagram of the training 3D point cloud having been projected onto a training image, generated by a camera sensor of the vehicle present in the networked computing environment of FIG. 2 at a same time as the training 3D point cloud, used by the processor of the networked computing environment of FIG. 2 for determining coverage statistical data of training objects present in the training image with LiDAR points for generating the training set of data for training the MLA to determine the degree of degradation of the 3D point cloud data of FIG. 4, in accordance with certain non-limiting embodiments of the present technology.

With reference to FIG. 7, there is depicted a schematic diagram of a merged representation 702 of the training road section 602 as perceived from the point of view of the LiDAR sensor 300 for determining, by the processor 110, a plurality of enrichment features associated with the training road section 602, in accordance with certain non-limiting embodiments of the present technology.

According to certain non-limiting embodiments of the present technology, to generate the merged representation 702, the training image 704 needs to be generated by the camera sensor 290 at a same time as the training 3D point cloud 604. To that end, the processor 110 can be configured to synchronize operation of the camera sensor 290 and the LiDAR sensor 300 such that both the camera sensor 290 and the LiDAR sensor 300 are configured to generate their data representative of the given portion of the surroundings 250 of the vehicle 220, such as the training image 704 and the training 3D point cloud 604 of the training road section 602, at a same moment in time.

How the processor 110 can be configured to synchronize the camera sensor 290 and the LiDAR sensor 300 is not limited and may include, in some non-limiting embodiments of the present technology, determining a temporal offset between generating images by the camera sensor 290 and 3D point cloud data by the LiDAR sensor 300 in a common time referential as described in detail in a co-owned United States Patent Application Publication No.: 2021/190,923-A1 published on Jun. 24, 2021, and entitled "METHODS AND SYSTEMS FOR ONLINE SYNCHRONIZATION OF SENSORS OF SELF-DRIVING VEHICLES (SDV)", content of which is incorporated herein by reference in its entirety.

Further, having generated the training image 704, the processor 110 can be configured to (i) identify therein training surrounding objects of the training road section 602; and (ii) generate, within the training image 704, bounding boxes around each one of the identified training surrounding objects present in the training road section 602—such as a respective bounding box 708 around a given training surrounding object 706. How the processor 110 can be configured to identify the given training surrounding object 706 is not limited and may include, for example, using a convolutional neural network (CNN) trained to extract visual features of pixels of the training image 704, such as colour, light intensity, and the like, and further classify the pixels, based on the extracted visual features, as being associated with one of (i) the given training surrounding object 706 in the training road section 602 and (ii) a background of the training road section 602.

According to certain non-limiting embodiments of the present technology, the processor 110 can be configured to generate the respective bounding boxes around training surrounding objects of a given predetermined surrounding object class—such as a vehicle, and thus remove all other training surrounding objects of the training road section 602 from further consideration.

However, in other non-limiting embodiments of the present technology, the processor 110 can be configured to generate the respective bounding boxes for and thus further consider training surrounding objects of other classes: such as other moving surrounding objects, for example, pedestrians (not separately labelled), or stationary surrounding objects including road posts or road signs (not separately labelled in FIG. 7, as well), as an example.

In some non-limiting embodiments of the present technology, the processor 110 can be configured to generate the respective bounding box only around training surrounding objects of the given predetermined surrounding object class that are not occluded by any other training surrounding object—such as the given training surrounding object 706. However, in other non-limiting embodiments of the present technology, the processor 110 can be configured to define a bounding box around a group of occluded objects—as, for example, the case of an other bounding box 712.

Further, as mentioned above, according to certain non-limiting embodiments of the present technology, the processor 110 can be configured to project, onto the training image 704, each LiDAR point of the training 3D point cloud 604. For example, the processor 110 can be configured to project each LiDAR point, such as the given LiDAR point 606, onto the training image 704, as a point in a 3D space to a given plane, that is, along a respective normal vector associated with a plane of the training image 704.

Thus, according to certain non-limiting embodiments of the present technology, the processor 110 can be configured to obtain the merged representation 702 of the training road section 602 where each training surrounding object of the given predetermined surrounding object class present therein is encompassed by the respective bounding box, such as the given training surrounding object 706 encompassed by the respective bounding box 708. Further, each respective bounding box can contain a set of LiDAR points having fallen therein as a result of the projection of the training 3D point cloud 604 onto the training image 704, such as a respective set of LiDAR points 710 having been projected within the respective bounding box 708.

Further, based on the respective set of LiDAR points 710, for the given training surrounding object 706, according to certain non-limiting embodiments of the present technology, the processor 110 can be configured to determine a plurality of enrichment features representative of the training road section 602 for inclusion thereof, along with the plurality of LiDAR features determined as described above, in the respective features vector of the given training digital object for training the MLA 260.

According to certain non-limiting embodiments of the present technology, the plurality of enrichment features for the given training surrounding object 706 can include, without limitation, at least one of:

- a respective distance value form the vehicle 220 to the given training surrounding object 706, such as a respective distance value 714;
- a total number of training surrounding objects within the training road section that the processor 110 has detected based on the training image 704—that is, around which the processor could generate the respective bounding box;
- a surface area of the respective bounding box 708 associated with the given training surrounding object 706;
- a number of LiDAR points of the training 3D point cloud 604 having fallen within the respective bounding box 708—namely, a number of LiDAR points in the set of LiDAR points 710 associated contained therein;
- a density of the LiDAR points in the set of LiDAR points 710;
- light intensity values of the LiDAR in the set of LiDAR points 710;
- average distance values from each of the LiDAR points in the set of LiDAR points 710; and
- energy values of each of the LiDAR points in the set of LiDAR points 710.

According to certain non-limiting embodiments of the present technology, the processor 110 can be configured to determine a given energy value associated with the given LiDAR point 606 based on a relation between a respective light intensity value associated therewith and the respective distance value thereto from the vehicle 220.

Thus, according to certain non-limiting embodiments of the present technology, the processor 110 can be configured to (i) determine the plurality of enrichment features for each one of the training surrounding objects present in the training road section 602 of the given predetermined surrounding object class—such as the given training surrounding object 706; and (ii) include the so determined values of the plurality of enrichment features associated with these training surrounding objects along with the plurality of LiDAR features, determined as described above with reference to FIG. 6, in the respective training feature vector of the given training digital object for training the MLA 260.

In additional non-limiting embodiments of the present technology, the processor 110 can further be configured to identify, based on the merged representation 702, bounding boxes associated with training surrounding objects of the given predetermined surrounding object class that are void of LiDAR points—that is, those that do not have any LiDAR point having fallen therein when projecting the training 3D point cloud 604 onto the training image 704—such as a void bounding box 715. The processor 110 can thus be configured to determine: (1) a number of such bounding boxes; and (2) respective surface area values thereof. Further, the processor 110 can be configured to include these values as additional features associated with the training road section 602 in the respective training feature vector of the given training digital object for training the MLA 260.

For example, in some non-limiting embodiments of the present technology, the processor 110 can be configured to store the plurality of enrichment features for the merged representation 702 of the training road section 602 in a form of a vector expressed by a following equation:

$$\{[O_1, f_1, f_2, \dots], \dots, [(V_1, S_{V_1}), \dots]\}, \qquad \text{(Equation 2)}$$

where $O_1$ is a set of coordinates, such as 2D Cartesian coordinates, of the respective bounding box 708 associated with the given training surrounding object 706 of the given predetermined surrounding object class present in the training road section 602;

$f_1$, $f_2$, . . . is the plurality of enrichment features determined based on the respective set of LiDAR points 710 having fallen within the respective bounding box 708 non-exhaustively listed above; and $(V_1, S_{V_1})$ are a set of coordinates and a respective surface area value of the void bounding box 715.

Further, in some non-limiting embodiments of the present technology, the processor 110 can be configured to generate the respective training feature vector for the training road section 602 by concatenating vector representations of the plurality of LiDAR features and the plurality of enrichment features expressed by Equation 1 and Equation 2, respectively. Thus, the respective training features vector may have, for example, a following expression:

$$\{ \dots, [N_i, (\dots, I_{ij}, \dots)], \dots \}; \{[O_1, f_1, f_2, \dots], \dots, [V_1, S_{V_1}, S_{V_1}), \dots]\} \qquad \text{(Equation 3)}$$

Further, according to certain non-limiting embodiments of the present technology, the processor 110 can be configured to receive a respective label for the training 3D point cloud 604 indicative of the degree of degradation of an ability thereof to be representative of the training road section 602. More specifically, according to certain non-limiting embodiments of the present technology, the respective label can be indicative of whether a reference training surrounding object is covered, in the merged representation 702 of the training road section 602, with LiDAR points within a respective predetermined distance value from the vehicle 220, such as one of a first predetermined distance value 716, a second predetermined distance value 718, and a third predetermined distance value 720. As it can be appreciated from FIG. 7, each one of the first predetermined distance value 716, the second predetermined distance value 718, and the third predetermined distance value 720 can be pre-determined as being smaller than a following one of the first predetermined distance value 716, the second predetermined distance value 718, and the third predetermined distance value 720. Thus, in a sense, the respective label is representative of a current visibility distance of the LiDAR sensor 300, at which the LiDAR sensor 300 is capable of recognizing the reference training surrounding object.

In some non-limiting embodiments of the present technology, the processor 110 can be configured to determine the reference training surrounding object as being of the given predetermined surrounding object class, that is, of a same surrounding object class as the training surrounding objects in the training road section 602, for which the processor 110 has generated the plurality of enrichment features. However, certain non-limiting embodiments of the present technology are based on developer's appreciation that assigning labels to the training road sections based on moving surrounding objects can cause elevated chances of error in determining a respective degree of degradation of a given training 3D point cloud generated by the LiDAR sensor 300. Thus, in other non-limiting embodiments of the present technology, the processor 110 can be configured to determine the reference training surrounding object as being of a different surrounding object class, such as that of stationary training surrounding objects disposed, for example, on a shoulder of the training road section 602. For example, such stationary training surrounding objects can include one of a first stationary training surrounding object 717, a second stationary training surrounding object 719, and a third stationary training surrounding object 721—that is, street lamps. However, other stationary surrounding object classes, such as trees, fire hydrants, road posts, or traffic lights, can also be used for determining the reference training surrounding object without departing from the scope of the present technology.

By way of example, if the processor 110 has determined the reference training surrounding object as being the first stationary training surrounding object 717, the respective label to be assigned to the training road section 602 can include an indication of whether the first stationary training surrounding object 717 is covered with LiDAR points within one of the first predetermined distance value 716, the second predetermined distance value 718, and the third predetermined distance value 720. To that end, in some non-limiting embodiments of the present technology, the respective label can take binary values, such as one of "0" and "1"; or "YES" and "NO" respectively indicative of whether the reference training object, within the given predetermined distance value, is covered with LiDAR points of the training 3D point cloud 604. Accordingly, the given predetermined distance value associated with the respective label can be indicative, for example, of current visibility conditions associated with the LiDAR sensor 300, such as a degree of contamination of its exit window, as an example, as described above.

In additional non-limiting embodiments of the present technology, the respective label may further include an indication of the given predetermined distance value, at which it has been determined that the reference training object was covered with LiDAR points.

In some non-limiting embodiments of the present technology, the respective label may be assigned to the merged representation 702 by the processor 110 based, for example, on certain heuristics including a number of LiDAR points representative of the reference training surrounding object. For example, if the reference training surrounding object has been determined as being the first stationary training surrounding object 717 and the given predetermined distance value has been determined as being the first predetermined distance value 716, the processor 110 can be configured to determine the respective label as being indicative of the reference training surrounding object being covered with LiDAR points within the first predetermined distance value 716. However, in another example, if the reference training surrounding object has been determined as being the third stationary training surrounding object 721 and the given predetermined distance value has been determined as being the third predetermined distance value 720, the processor 110 can be configured to determine the respective label as being indicative of the reference training surrounding object 717 being not covered with LiDAR points within the third predetermined distance value 720 as a number of LiDAR points representative of the third predetermined distance value 720 in the merged representation 702 can be lower than a predetermined threshold value for the LiDAR sensor 300 reliably recognize the third stationary training surrounding object 721.

However, in other non-limiting embodiments of the present technology, the respective label can be assigned to the merged representation 702 of the training road section 602 by a human assessor (not depicted). To that end, the merged representation 702 can be presented to the human assessor via an electronic device implemented similarly to the electronic device 210 described above. Further, the human assessor can make their own determination as to whether the reference training surrounding object is covered with LiDAR points or not, within each one of the first predetermined distance value 716, the second predetermined distance value 718, and the third predetermined distance value 720. In other words, according to certain non-limiting embodiments of the present technology, the respective label can be indicative of whether within the given predetermined distance value the reference training surrounding object is covered with LiDAR points as perceived by the human assessor.

In some non-limiting embodiments of the present technology, the merged representation 702 can be presented to the human assessor as one of a sequence of merged representations of the surroundings 250 of the vehicle 220 generated in a form of a video clip of a predetermined length, such as 6 seconds, as an example, as the vehicle 220 moves along a training movement trajectory thereof. To that end, as the video clip being displayed to the human assessor, the human assessor can be asked to determine if the reference training surrounding object is covered with LiDAR points of the training 3D point cloud at each one of the first predetermined distance value 716, the second predetermined distance value 718, and the third predetermined distance value 720.

Further, in some non-limiting embodiments of the present technology, the processor 110 can be configured to include the respective label in the respective training feature vector associated with the training road section 602, for example, as follows:

$$\{ \ldots ,[N_i,( \ldots ,I_{ij}, \ldots )], \ldots \};\{[O_1,f_1, f_2, \ldots ], \ldots ,[(V_1,S_{V_1}), \ldots ]\};\{L\}, \qquad \text{(Equation 4)}$$

where L is the respective label having been assigned, for example, by the human assessor, and being indicative of whether the reference training surrounding object is covered with LiDAR points in the merged representation 702 within the given predetermined distance value from the vehicle 220, as perceived by the human assessor.

Thus, according to certain non-limiting embodiments of the present technology, the processor 110 can be configured to generate the given training digital object of the plurality of training digital objects for training the MLA 260. Further, as it can be appreciated, the processor 110 can be configured to generate other ones of the plurality of training digital objects by processing image data, synchronically generated by the camera sensor 290 and the LiDAR sensor 300, representative of other training road sections in a similar way as described above, and assigning respective labels thereto. By doing so, the processor 110 can be configured to generated thousands or even hundreds of thousands of training digital objects of the plurality of training digital objects for training the MLA 260.

Further, the processor 110 can be configured to sequentially descending each one of the plurality of training digital objects through branches of each one of the ensemble of decision trees implemented as described with reference to FIG. 5. More specifically, by descending the given one of the plurality of training digital objects, the processor 110 can be configured to determine splits between nodes within a given one of the ensemble of decision trees based on features of the respective training feature vector. Further, using, for example, the boosting approach to forming the ensemble of decision trees, as described further above with reference to FIG. 5, the processor 110 can be configured to minimize the loss function between the outputs of the ensemble, at a current iteration of generation thereof, and the targets thereof represented by respective labels assigned to each one of the plurality of training digital objects as described above. Thus, the processor 110 can be configured to expand the ensemble (or the forest) of decision trees until a predetermined difference threshold value of the loss function is reached.

Thus, according to certain non-limiting embodiments of the present, the processor 110 can be configured to generate the training set of data for training the MLA 260 to determine the degree of degradation of 3D point cloud data 310.

However, prior to the training the MLA 260 based on the plurality of training digital objects as described above, in some non-limiting embodiments of the present technology, the processor 110 can be configured to modify the respective label of the given training digital object. More specifically, in some non-limiting embodiments of the present technology, the processor 110 can be configured to: (1) apply a secondary MLA (not depicted) to at least a portion of the respective training feature vector representative of the training road section 602; and (2) determine a machine-generated label indicative of a predicted degree of degradation of the training 3D point cloud 604. Further, in response to the degree of degradation represented by the respective label being misaligned with the predicted degree of degradation, the processor 110 can be configured to replace the respective label determined, for example, by the human assessor, with the machine-generated label.

According to certain non-limiting embodiments of the present technology, the secondary MLA can be hosted and trained by one of the server 235 and the electronic device 210, as the MLA 260. Further, it is not limited how the secondary MLA is implemented; however, in some non-limiting embodiments of the present technology, the secondary MLA can be implemented similarly, with certain optional modifications, to the MLA 260. Thus, in certain non-limiting embodiments of the present technology, the secondary MLA can comprise an ensemble of decision trees, each one of which may include all or some components of the decision tree model 500. Similarly, the ensemble of decision trees of the secondary MLA can be generated, by the processor 110, using the boosting approach as described above.

Further, according to certain non-limiting embodiments of the present technology, the processor 110 can be configured to generate a secondary training set of data for training the secondary MLA based on the training set of data used for training the MLA 260. In other words, the processor 110 can be configured to use at least a portion of the plurality of training digital objects generated as described above to generate a secondary plurality of training digital objects for training the secondary MLA. It is not limited how the processor 110 can be configured to select training digital objects from the plurality of training digital objects for inclusion thereof in the secondary plurality of training digital objects, and may include random selection of the training digital objects, based, for example, on the normal distribution law.

Further, in some non-limiting embodiments of the present technology, the processor 110 can be configured to reduce dimensionality of each respective training feature vector of the secondary plurality of training digital objects. In other words, for a given training feature vector of the secondary plurality of training digital objects, the processor 110 can be configured not to use all the features described above with reference to FIGS. 6 and 7, but only a portion of them.

More specifically, in some non-limiting embodiments of the present technology, the processor 110 can be configured to reduce the dimensionality of the given training feature vector of the secondary plurality of training digital objects by removing therefrom or otherwise not using the plurality of LiDAR features of a given secondary training 3D point cloud (not depicted) representative of a respective secondary training road section, and thus leaving therein only the plurality of enrichment features associated with each training surrounding object present in the respective secondary training road section, as described above. Thus, according to certain non-limiting embodiments of the present technology, a respective training digital object of the secondary plurality of training digital objects can comprise: (i) the given training feature vector including the plurality of enrichment features for each one of the training surrounding objects of the given predetermined surrounding object class present in the respective secondary training road section; and (ii) the respective label indicative of a degree of degradation of the given secondary training 3D point cloud, determined as described above.

Thus, in some non-limiting embodiments of then present technology, after training, the secondary MLA can have a lower dimensionality than that of the MLA 260. Put it another way, due to a fewer number of features used for training the secondary MLA, its decision trees may have lower "depth"—that is, fewer levels between their root nodes and leaves. Also, during the training of the secondary MLA, which can be implemented similarly to that of the MLA 260, in some non-limiting embodiments of the present technology, to prevent the secondary MLA from overfitting, the processor 110 can be configured to generate a number of decision trees not exceeding a predetermined decision tree number threshold value, which can be, for example, 5, 10, or 15.

Thus, the processor 110 can be configured to train the secondary MLA to generate the machine-generated label for a training road section, such as the training road section 602 described above. Further, the processor 110 can be configured to use the secondary MLA to determine the machine-generated label. More specifically, the processor 110 can be configured to: (1) pre-process the respective training feature vector (namely, a portion thereof excluding the respective label) associated with the training road section 602 such that a dimensionality thereof corresponds to that of training feature vectors used for training the secondary MLA; and (2)

feed the so pre-processed (or "in-use" in the present case) respective training feature vector to the secondary MLA.

Further, if the machine-generated label meets certain conditions, according to certain non-limiting embodiments of the present technology, the processor 110 can be configured to replace the respective label associated with the respective training feature vector in the given training digital object with the machine-generated label. More specifically, the processor 110 can be configured to replace the respective label with the machine-generated label if the following conditions are met: (i) the predicted degradation degree of the training 3D point cloud 604 is misaligned with the degradation degree indicated by the respective label; (ii) the predicted degradation degree of the training 3D point cloud 604 is higher than the degradation degree; and (iii) a confidence level associated with the predicted degradation degree being equal to or greater than a predetermined confidence level threshold, which may be, for example, without limitation 0.7, 0.85, or 0.95, as an example.

Returning to the example above with respect to assigning the respective label to the training road section 602 based on coverage of the reference training surrounding object with LiDAR points, let it be assumed that the reference training surrounding object has been determined as being the second stationary training surrounding object 719, and the human assessor has been provided with the merged representation 702 of the training road section to determine if the second stationary training surrounding object 719 is covered with LiDAR points within the second predetermined distance value 718. Thus, the human assessor can submit "1" indicative of the second stationary training surrounding object 719 being covered, as perceived by them, with LiDAR points within the second predetermined distance value 718. However, the predicted degree of degradation determined by the secondary MLA, based on the respective training feature vector, can be indicative of the second stationary training surrounding object 719 being not covered with LiDAR points within the second predetermined distance value 718. Further, if the predicted degree of degradation of the training 3D point cloud 604 has been determined, by the secondary MLA, with a confidence level of 0.85 given that the predetermined confidence level threshold is 0.8, the processor 110 can be configured to assign a "0", indicative of the reference training surrounding object being not covered with LiDAR points, to the respective training feature vector instead of the "1" provided by the human assessor.

In another example, the processor 110 can be configured to determine the reference training object as being the first stationary training surrounding object 717, and the human assessor can be asked to determine if it is covered with LiDAR points within the first predetermined distance value 716. The human assessor may submit "YES", meaning that the human assessor perceives the reference training surrounding object as being covered with LiDAR points within the first predetermined distance value 716. Further, the secondary MLA can be applied to the respective training feature vector and may also determine that the reference training surrounding object as being covered with LiDAR points within the first predetermined distance value 716. In this case, the respective label would not be swapped with the machine-generated label.

In other words, the respective training feature vector of Equation 4 will look as follows:

$$\{ \ldots, [N_P(\ldots, I_{ij}, \ldots)], \ldots \}; \{[O_1, f_1, \\ f_2 \ldots], [(V_1, S_{r_1}), \ldots]\}; \{M\}, \qquad \text{(Equation 5)}$$

where M is the machine-generated label indicative of the predicted degree of degradation of the training 3D point cloud 604 determined by the secondary MLA.

However, in spite of replacing the respective label with the machine-generated label, in some non-limiting embodiments of the present technology, the processor 110 can be configured to still use the respective label. More specifically, the processor 110 can be configured to reduce the dimensionality of the respective training feature vector as defined by Equation 4 by leaving therein only the plurality of LiDAR features. By doing so, the processor 110 can be configured to generate a reduced respective training feature vector looking as follows:

$$\{ \ldots, [N_P(\ldots, I_{ij}, \ldots)], \ldots \}, \{L\}, \qquad \text{(Equation 6)}$$

Further, in some non-limiting embodiments of the present technology, the processor 110 can be configured to include the so generated reduced respective training feature vector associated with the respective label as a separate training digital object in the plurality of training digital objects for training the MLA 260 as described above.

Thus, the processor 110 can be configured to train the MLA 260 to determine the degree of degradation of in-use 3D point cloud data, such as the 3D point cloud data 310 described above. Further, the processor 110 of one of the electronic device 210 or the server 235 can be configured to apply the so trained MLA 260 to the 3D point cloud data 310 to determine the degree of degradation thereof, as will now be described.

In-Use Process

Figure 8:
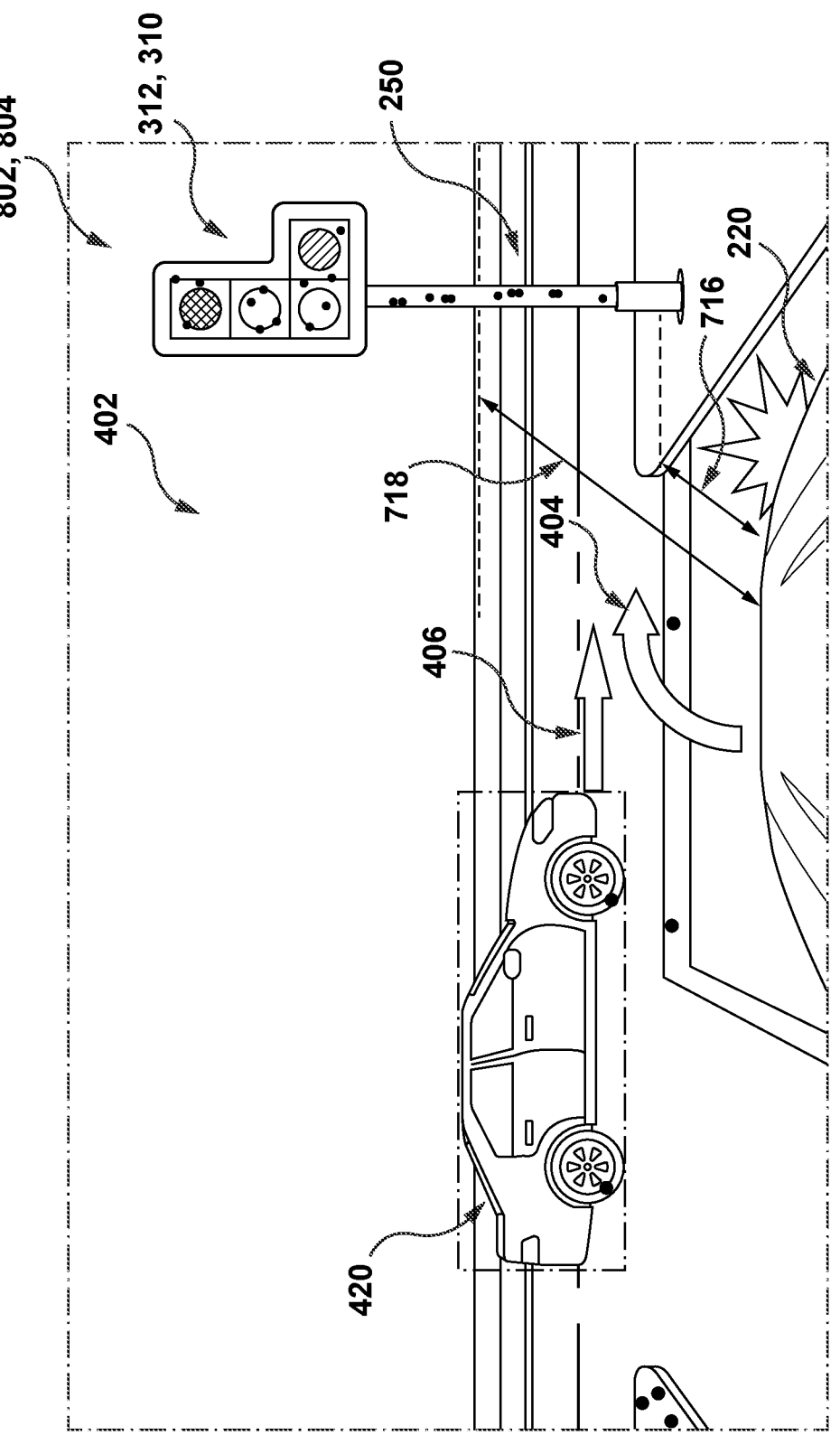
FIG. 8 depicts a schematic diagram of the processor of the networked computing environment using the trained MLA to determine the degree of degradation of the 3D point cloud data representative of the given portion of the surrounding area of the vehicle depicted in FIG. 4, in accordance with certain non-limiting embodiments of the present technology.

With reference to FIG. 8, there is depicted a schematic diagram of the processor 110 using the MLA 260 for determining the degree of degradation of the 3D point cloud 312, in accordance with certain non-limiting embodiments of the present technology.

According to certain non-limiting embodiments of the present technology, to determine the degree of degradation of the 3D point cloud data 310 using the MLA 260, the processor 110 can be configured to: (1) receive, from the LiDAR sensor 300, the 3D point cloud 312 representative, for example, of the given road section 402 described above; (2) receive, form the camera sensor 290, an image 804 representative of the given road section 402 and generated at the same time as the 3D point cloud 312; (3) project each one of the 3D point cloud 312 onto the image 804, thereby generating an in-use merged representation 802 to determine statistical data of coverage of surrounding objects, such as the upcoming vehicle 420, with LiDAR points of the 3D point cloud 312; and (4) determine an in-use feature vector representative of the given road section 402, as described above with respect to the training road section 602.

Further, the processor 110 can be configured to feed the in-use feature vector to the MLA 260, and the MLA 260 can be configured to determine that the current visibility distance of the LiDAR sensor 300 corresponds to a level of the first predetermined distance value 716. In other words, given the in-use feature vector, the processor 110 can be configured to determine that the LiDAR sensor 300 is not capable of reliably recognizing surrounding objects at a distance beyond the first predetermined distance value 716.

As it can be appreciated, as the processor 110 can be configured to generate the in-use feature vector having features corresponding, in type, to the respective training feature vector mentioned above, in some non-limiting embodiments of the present technology, by using the MLA 260 can be configured to determine the degree of degradation of the 3D point cloud 312 with respect to the surrounding objects of the given predetermined surrounding object class, such as a vehicle. In other words, turning back to the current example of FIG. 8, the processor 110 can be configured to determine that the LiDAR sensor 300 is not capable of reliably recognizing surrounding objects of the given predetermined surrounding object class, such as the upcoming vehicle 420, at the distance beyond the first predetermined distance value 716.

Further, the processor 110 can be configured to determine if the so determined degree of degradation of the 3D point cloud 312 generated by the LiDAR sensor 300 exceeds a predetermined LiDAR data degradation threshold, which, for example, can be predetermined as being indicative of a visibility distance of the LiDAR sensor 300 corresponding to the second predetermined distance value 718.

Further, in response to determining that the degree of degradation of the 3D point cloud 312 exceeds the predetermined LiDAR data degradation threshold, the processor 110 can be configured to cause execution of at least one predetermined preventive actions. For example, the processor 110 can be configured to cause activation of a built-in cleaning function of the LiDAR sensor 300. In another example, the processor 110 can be configured to generate a notification for the operator of the vehicle 220 that the LiDAR sensor 300 requires maintenance including an indication of urgency thereof, such as moderate or immediate. In yet another example, the processor 110 can be configured to cause the vehicle 220 to decelerate to a predetermined speed level associated with the predetermined LiDAR data degradation threshold, such as 20 km/h or 30 km/h, as an example. Also, the processor 110 can be configured to cause the vehicle 220 to pull over immediately after determining that the degree of degradation of the 3D point cloud 312 is lower than the predetermined LiDAR data degradation threshold.

Thus, the processor 110 may be configured to prevent a collision between the vehicle 220 and the upcoming vehicle 420.

Method

Figure 9:
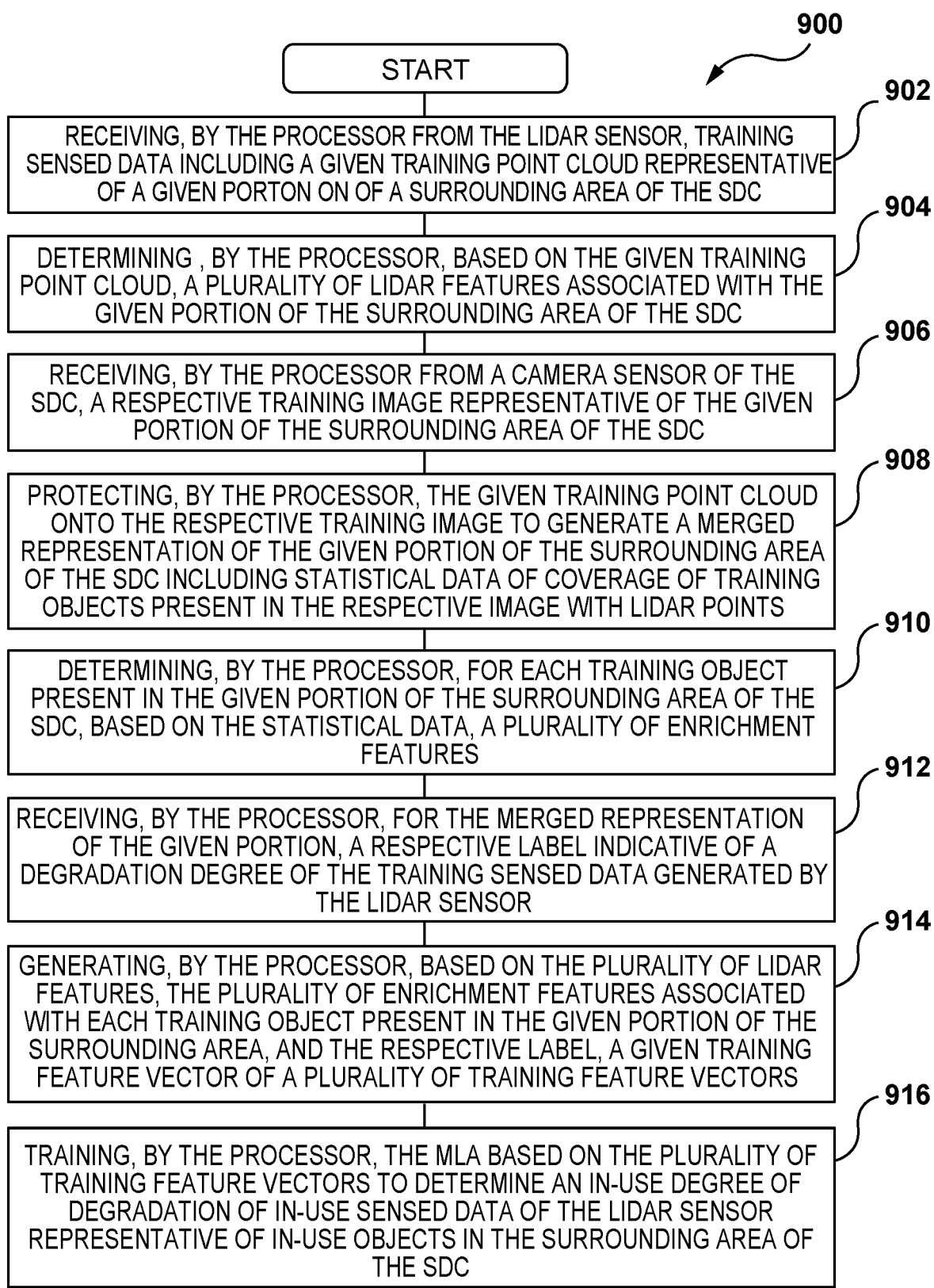
FIG. 9 depicts a flowchart diagram of a computer-implemented method of determining the degree of degradation of the 3D point cloud data of FIG. 4 using the trained MLA, in accordance with certain non-limiting embodiments of the present technology.

Given the architecture and the examples provided here-inabove, it is possible to execute a method for determining a degree of degradation of the 3D point cloud data generated by the LiDAR sensor 300, such as the 3D point cloud data 310 including the 3D point cloud 312 representative of the given road section 402. With reference now to FIG. 9, there is depicted a flowchart of a method 900, according to certain non-limiting embodiments of the present technology. The method 900 can be executed by the processor 110. The processor 110 may, for example, be part of the electronic device 210.

As mentioned herein above, to determine the degree of degree of degradation of the 3D point cloud data 310, the processor 110 can be configured to train an MLA, such as the MLA 260, comprising an ensemble of decision trees, each one of which can be implemented based on the decision tree model 500 described above with reference to FIG. 5.

Step 902: Receiving, by the Processor from the Lidar Sensor, Training Sensed Data Including a Given Training Point Cloud Representative of a Given Portion of a Surrounding Area of the SDC The method 900 commences at step 902 with the processor 110 being configured to receive, from the LiDAR sensor 300, training 3D point cloud data representative of the given portion of the surroundings 250 of the vehicle 220. For example, as mentioned above with reference to FIG. 6, the processor 110 can be configured to receive the training 3D point cloud 604 representative of the training road section 602—such as in accordance with the LiDAR data acquisition procedure 302 described above with reference to FIG. 3.

The method 900 thus proceeds top step 904.

Step 904: Determining, by the Processor, Based on the Given Training Point Cloud, a Plurality of Lidar Features Associated with the Given Portion of the Surrounding Area of the SDC Further, at step 904, according to certain non-limiting embodiments of the present technology, the processor 110 can be configured to determine, based on the training 3D point cloud 604 of the training road section 602, the plurality of LiDAR features of the training road section 602, as described above with reference to FIG. 6.

More specifically, the processor 110 can be configured to determine: (i) a total number of LiDAR points of the training point cloud 604; and (ii) light intensity values of each LiDAR point of the training 3D point cloud 604, such as the given training LiDAR point 606.

In additional non-limiting embodiments of the present technology, the processor 110 can be configured to determine the plurality of LiDAR features for each one of the plurality of HFOV angles of the HFOV of the LiDAR sensor 300, such as the given HFOV angle 610, as described further above with reference to FIG. 6.

Thus, the processor 110 can be configured to determine the plurality of LiDAR features associated with the training road section 602 and generate a vector representation thereof expressed, for example, by Equation 1 above.

The method 900 thus advances to step 906.

Step 906: Receiving, by the Processor from a Camera Sensor of the SDC, a Respective Training Image Representative of the Given Portion of the Surrounding Area of the SDC Further, at step 906, the processor 110 can be configured to receive, for example, from the camera sensor 290 of the vehicle 220, the training image 704 representative of the training road section 602. To that end, as noted above, the processor 110 can be configured to cause each one of the LiDAR sensor 300 and the camera sensor 290 to generate the training 3D point cloud 604 and the training image 704 representative of the training road section 602, respectively, at the same time. To do so, the processor 110 can be configured to apply one of the approaches described in United States Patent Application Publication No.: 2021/190,923-A1 referenced above.

Further, the processor 110 can be configured to detect, for example, by applying the trained CNN, the training surrounding objects in the training image 704, such as the given training surrounding object 706. Additionally, the processor 110 can be configured to determine a surrounding object class of each one of the training surrounding object within the training image 704, such as one of a vehicle, a street lamp, a road pots, a traffic light, and the like.

Further, having detected the training surrounding objects, the processor 110 can be configured to generate, around each one thereof, a respective bounding box—such as the respective bounding box 708 encompassing the given training surrounding object 706.

The method 900 hence advances to step 908.

Step 908: Projecting, by the Processor, the Given Training Point Cloud onto the Respective Training Image to Generate a Merged Representation of the Given Portion of the Surrounding Area of the SDC Including Statistical Data of Coverage of Training Objects Present in the Respective Image with Lidar Points Further, as described in detail above with reference to FIG. 7, at step 908, the processor 110 can be configured to project LiDAR points of the training 3D point cloud 604 onto the training image 704 to generate the merged representation 702 of the training road section 602. The merged representation 702 thus includes statistical data of coverage of the training surrounding objects present in the training road section 602 with LiDAR points of the training 3D point cloud 604—such as data of the respective set of LiDAR points 710 covering the given training surrounding object 706.

The method 900 hence advances to step 910.

Step 910: Determining, by the Processor, for Each Training Object Present in the Given Portion of the Surrounding Area of the SDC, Based on the Statistical Data, a Plurality of Enrichment Features Thus, at step 910, according to certain non-limiting embodiments of the present technology, based on the statistical data of coverage, the processor 110 can be configured to determine the plurality of enrichment features for each training surrounding object present in the training road section 602.

More specifically, as described further above with reference to FIG. 7, for the given training surrounding object 706, based on the set of LiDAR points 710, the processor 110 can be configured to determine at least one:

- a respective distance value form the vehicle 220 to the given training surrounding object 706, such as a respective distance value 714;
- a total number of training surrounding objects within the training road section that the processor 110 has detected based on the training image 704—that is, around which the processor could generate the respective bounding box;
- a surface area of the respective bounding box 708 associated with the given training surrounding object 706;
- a number of LiDAR points of the training 3D point cloud 604 having fallen within the respective bounding box 708—namely, a number of LiDAR points in the set of LiDAR points 710 associated contained therein;
- a density of the LiDAR points in the set of LiDAR points 710; light intensity values of the LiDAR in the set of LiDAR points 710;
- average distance values from each of the LiDAR points in the set of LiDAR points 710; and
- energy values of each of the LiDAR points in the set of LiDAR points 710.

In additional non-limiting embodiments of the present technology, the processor 110 can further be configured to identify, based on the merged representation 702, bounding boxes associated with training surrounding objects of the given predetermined surrounding object class that are void of LiDAR points—that is, those that do not have any LiDAR point having fallen therein when projecting the training 3D point cloud 604 onto the training image 704—such as a void bounding box 715. The processor 110 can thus be configured to determine: (1) a number of such bounding boxes; and (2) respective surface area values thereof. Further, the processor 110 can be configured to include these values as additional features associated with the training road section 602 in the respective training feature vector of the given training digital object for training the MLA 260.

In some non-limiting embodiment of the present technology, the processor 110 can be configured to determine the plurality of enrichment features only for objects of the given predetermined surrounding object class, such as a vehicle.

Thus, the processor 110 can be configured to determine the plurality of enrichment features for each training surrounding object of the given predetermined surrounding object class, and generate a vector representation thereof, expressed, for example, by Equation 2 above.

Further, by concatenating vector representations of the plurality of LiDAR features and the plurality of enrichment features for each training surrounding object expressed by Equation 1 and Equation 2, respectively, the processor 110 can be configured to generate the respective training feature vector of the given training digital object associated with the training road section 602, expressed, for example, by Equation 3 above.

The method 900 thus proceeds to step 912.

Step 912: Receiving, by the Processor, for the Merged Representation of the Given Portion, a Respective Label Indicative of a Degradation Degree of the Training Sensed Data Generated by the Lidar Sensor Further, at step 912, the processor 110 can be configured to receive, for the training section 602, the respective label indicative of the degree of degradation of the training 3D point cloud 604. As noted above, the respective label can be indicative of whether the reference training surrounding object, in the merged representation 602 of the training road section 602, is covered with LiDAR points of the training 3D point cloud 604 within the given predetermined distance value, such as one of the first predetermined distance value 716, the second predetermined distance value 718, and the third predetermined distance value 720.

In those non-limiting embodiments of the present technology, where the processor 110 can be configured to generate the respective feature vector considering only the training surrounding objects of the given predetermined surrounding object class, the processor 110 can be configured to determine the reference training surrounding object as being of the given predetermined surrounding object class, as well.

However, in other non-limiting embodiments of the present technology, the processor 110 can be configured to determine the reference training surrounding object as being of a different surrounding object class, such as one of the first stationary training surrounding object 717, the second stationary training surrounding object 719, and the third stationary training surrounding object 721.

Further, according to certain non-limiting embodiments of the present technology, the respective label can be assigned to the merged representation 702 of the training road section 602 by the human assessor, as described above. To that end, the merged representation 702 can be presented to the human assessor via an electronic device implemented similarly to the electronic device 210 described above. Further, the human assessor can make their own determination as to whether the reference training surrounding object is covered with LiDAR points or not, within each one of the first predetermined distance value 716, the second predetermined distance value 718, and the third predetermined distance value 720. In other words, according to certain non-limiting embodiments of the present technology, the respective label can be indicative of whether within the given predetermined distance value the reference training surrounding object is covered with LiDAR points as perceived by the human assessor.

The method 900 thus proceeds to step 914.

Step 914: Generating, by the Processor, Based on the Plurality of Lidar Features, the Plurality of Enrichment Features Associated with Each Training Object Present in the Given Portion of the Surrounding Area, and the Respective Label, a Given Training Feature Vector of a Plurality of Training Feature Vectors Further, at step 914, the processor 110 can be configured to generate, based on the respective training feature vector and the respective label associated with the training road section 602, the processor 110 can be configured to generate the given training digital object of the plurality of training digital objects for training the MLA 260, a vector representation of which is expressed by Equation 4.

Further, as it can be appreciated, the processor 110 can be configured to generate other ones of the plurality of training digital objects by processing image data, synchronically generated by the camera sensor 290 and the LiDAR sensor 300, representative of other training road sections in a similar way as described above, and assigning respective labels thereto. By doing so, the processor 110 can be configured to generated thousands or even hundreds of thousands of training digital objects of the plurality of training digital objects for training the MLA 260.

Further, in additional non-limiting embodiments of the present technology, the processor 110 can be configured to modify the respective label of the given training digital object. More specifically, in some non-limiting embodiments of the present technology, the processor 110 can be configured to: (1) apply the secondary MLA (not depicted) to at least a portion of the respective training feature vector representative of the training road section 602; and (2) determine the machine-generated label indicative of a predicted degree of degradation of the training 3D point cloud 604.

As mentioned above, the secondary MLA can be implemented similarly to the MLA 260, that is, as an ensemble of decision trees, however having a lower dimensionality. By lower dimensionality, it is meant that the secondary MLA can be trained on at least a portion of the plurality of training digital objects generated as described above, whose respective training feature vectors have fewer features, such as fewer enrichment features associated with each one of the training surrounding object. Further, in some non-limiting embodiments, the secondary MLA can include the number of decision trees not exceeding a predetermined decision tree number threshold value, which can be, for example, 5, 10, or 15, as described above.

More specifically, the processor 110 can be configured to replace the respective label with the machine-generated label if the following conditions are met: (i) the predicted degradation degree of the training 3D point cloud 604 is misaligned with the degradation degree indicated by the respective label; (ii) the predicted degradation degree of the training 3D point cloud 604 is higher than the degradation degree; and (iii) a confidence level associated with the predicted degradation degree being equal to or greater than a predetermined confidence level threshold, which may be, for example, without limitation 0.7, 0.85, or 0.95, as an example Thus, in response to the machine-generated label, generated by the secondary MLA based on the respective feature vector associated with the training road section 602, meeting the above conditions, the processor 110 can be configured to replace the respective label with the machine-generated label. Thus, the vector representation of the given training digital object can have a look of Equation 5 above.

Further, in spite of replacing the respective label with the machine-generated label, in some non-limiting embodiments of the present technology, the processor 110 can be configured to still use the respective label. More specifically, the processor 110 can be configured to reduce the dimensionality of the respective training feature vector as defined by Equation 4 by leaving therein only the plurality of LiDAR features. By doing so, the processor 110 can be configured to generate the reduced respective training feature vector looking as defined by Equation 6.

Further, in some non-limiting embodiments of the present technology, the processor 110 can be configured to include the so generated reduced respective training feature vector associated with the respective label as a separate training digital object in the plurality of training digital objects for training the MLA 260 as described above.

Thus, the method 900 advances to step 916.

Step 916: Training, by the Processor, the MLA Based on the Plurality of Training Feature Vectors to Determine an in-Use Degree of Degradation of in-Use Sensed Data of the Lidar Sensor Representative of in-Use Objects in the Surrounding Area of the SDC Further, at step 916, as described above, based on the so generated plurality of training digital objects, the processor 110 can be configured to train the MLA 260 to determine the degree of degradation of the 3D point cloud data 310.

After the training, the processor 110 can be configured to use the MLA 260 to determine the degree of degradation of the 3D point cloud data 310, such as the 3D point cloud 312 representative of the given road section 402, as described above with reference to FIG. 8.

More specifically, according to certain non-limiting embodiments of the present technology, the processor 110 can be configured to: (1) receive, from the LiDAR sensor 300, the 3D point cloud 312 representative, for example, of the given road section 402 described above; (2) receive, form the camera sensor 290, an image 804 representative of the given road section 402 and generated at the same time as the 3D point cloud 312; (3) project each one of the 3D point cloud 312 onto the image 804, thereby generating an in-use merged representation 802 to determine statistical data of coverage of surrounding objects, such as the upcoming vehicle 420, with LiDAR points of the 3D point cloud 312; and (4) determine the in-use feature vector representative of the given road section 402, as described above with respect to the training road section 602.

Further, the processor 110 can be configured to feed the in-use feature vector to the MLA 260, and the MLA 260 can be configured to determine that the current visibility distance of the LiDAR sensor 300 corresponds to a level of the first predetermined distance value 716. In other words, given the in-use feature vector, the processor 110 can be configured to determine that the LiDAR sensor 300 is not capable of reliably recognizing surrounding objects at a distance beyond the first predetermined distance value 716.

Further, the processor 110 can be configured to determine if the so determined degree of degradation of the 3D point cloud 312 generated by the LiDAR sensor 300 exceeds a predetermined LiDAR data degradation threshold, which, for example, can be predetermined as being indicative of a visibility distance of the LiDAR sensor 300 corresponding to the second predetermined distance value 718.

Further, in response to determining that the degree of degradation of the 3D point cloud 312 exceeds the predetermined LiDAR data degradation threshold, the processor 110 can be configured to cause execution of at least one predetermined preventive actions. For example, the processor 110 can be configured to cause activation of a built-in cleaning function of the LiDAR sensor 300. In another example, the processor 110 can be configured to generate a notification for the operator of the vehicle 220 that the LiDAR sensor 300 requires maintenance including an indication of urgency thereof, such as moderate or immediate. In yet another example, the processor 110 can be configured to cause the vehicle 220 to decelerate to a predetermined speed level associated with the predetermined LiDAR data degradation threshold, such as 20 km/h or 30 km/h, as an example. Also, the processor 110 can be configured to cause the vehicle 220 to pull over immediately after determining that the degree of degradation of the 3D point cloud 312 is lower than the predetermined LiDAR data degradation threshold.

Thus, certain non-limiting embodiments of method 900 allow increasing accuracy of determination of the degree of degradation of 3D point cloud data 310 generated by the LiDAR sensor 300 and further taking preventive actions in a timely manner, which may help prevent car accidents caused by collisions of the vehicle 220 with other objects.

The method 900 thus terminates.

Modifications and improvements to the above-described implementations of the present technology may become apparent to those skilled in the art. The foregoing description includes example implementations of the present technology an in no way intends to be limiting. The scope of the present technology is therefore intended to be limited solely by the scope of the appended claims.

While the above-described implementations have been described and shown with reference to particular steps performed in a particular order, it will be understood that some of these steps may be combined, sub-divided, or re-ordered without departing from the teachings of the present technology. Accordingly, the order and grouping of the steps is not a limitation of the present technology.

The invention claimed is:

1. A computer-implemented method of determining a degree of point cloud data degradation of a Light Detection and Ranging (LiDAR) sensor of a Self-Driving Car (SDC) using a Machine-Learning Algorithm (MLA), the method being executable by at least one processor communicatively coupled to the LiDAR sensor, the method comprising, during a training phase, training the MLA by:

receiving, by the at least one processor from the LiDAR sensor, training sensed data including a given training point cloud representative of a given portion of a surrounding area of the SDC;

determining, by the at least one processor, based on the given training point cloud, a plurality of LiDAR features associated with the given portion of the surrounding area of the SDC;

receiving, by the at least one processor from a camera sensor of the SDC, a respective training image representative of the given portion of the surrounding area of the SDC, the respective training image having been generated, by the camera sensor, at a same time as the sensed data by the LiDAR sensor;

projecting, by the at least one processor, the given training point cloud onto the respective training image to generate a merged representation of the given portion of the surrounding area of the SDC including statistical data of coverage of training objects present in the respective image with LiDAR points;

determining, by the at least one processor, for each training object present in the given portion of the surrounding area of the SDC, based on the statistical data, a plurality of enrichment features;

receiving, by the at least one processor, for the merged representation of the given portion, a respective label indicative of a degradation degree of the training sensed data generated by the LiDAR sensor;

generating, by the at least one processor, based on the plurality of LiDAR features, the plurality of enrichment features associated with each training object present in the given portion of the surrounding area of the SDC, and the respective label, a given training feature vector of a plurality of training feature vectors;

training, by the at least one processor, the MLA based on the plurality of training feature vectors to determine an in-use degree of degradation of in-use sensed data of the LiDAR sensor representative of in-use objects in the surrounding area of the SDC.

2. The method of claim 1, wherein the plurality of LiDAR features includes: (i) a number of LiDAR points in the given training point cloud; and (ii) light intensity values of the LiDAR points in the given training point cloud.

3. The method of claim 2, wherein the determining the plurality of LiDAR features comprises:

defining, along a horizontal field of view (HFOV) of the LiDAR sensor, a plurality of angles of the HFOV; and determining the plurality of LiDAR features for LiDAR points of the given training point cloud having fallen in each angle of the plurality of angles the HFOV of the LiDAR sensor.

4. The method of claim 1, wherein the determining the plurality of enrichment features for a given training object in the given portion of the surrounding area of the SDC includes:

generating, by the at least one processor, a respective bounding box representative of the given training object; and determining, by the at least one processor, at least one of:

a respective distance value from the SDC to the given training object;

a number of the training objects in the given portion of the surrounding area of the SDC;

a surface area of the respective bounding box associated with the given training object;

a number of LiDAR points having fallen within the respective bounding box;

a density of the LiDAR points having fallen within the respective bounding box;

light intensity values of the LiDAR points having fallen within the respective bounding box;

average distance values from the LiDAR sensor to the LiDAR points having fallen within the respective bounding box; and energy values of the LiDAR points having fallen within the respective bounding box.

5. The method of claim 4, wherein the respective label comprises data indicative of whether at least one reference training object is covered with LiDAR points at the respective distance value from the SDC.

6. The method of claim 5, wherein the given training object is of a first predetermined object class, and the at least one reference training object is of a second predetermined object class, different from the first predetermined object class.

7. The method of claim 6, wherein the first predetermined object class is a vehicle.

8. The method of claim 4, wherein the generating the given training feature vector further comprises:

determining, by the at least one processor, based on the merged representation, a number of bounding boxes void of LiDAR points; and determining, by the at least one processor, surface area values of the bounding boxes void of LiDAR points.

9. The method of claim 1, wherein the respective label has been generated by a human assessor, and the degradation degree of the training sensed data has been determined as being perceived by the human assessor.

10. The method of claim 1, wherein the generating the given training feature vector comprises adjusting the respective label using a machine-generated label indicative of a predicted degradation degree of the training sensed data, the predicted degradation degree having been determined by a secondary MLA, which has been trained to determine predicted degradation degrees of the training sensed data of the LiDAR sensor, the secondary MLA being different from the MLA, the adjusting comprising:

in response to every one of: (i) the predicted degradation degree of the training sensed data generated by the secondary MLA being misaligned with the degradation degree indicated by the respective label; (ii) the predicted degradation degree of the training sensed data being higher than the degradation degree; and (iii) a confidence level associated with the predicted degradation degree being equal to or greater than a predetermined confidence level threshold, replacing the respective label with the machine-generated label in the given training feature vector.

11. The method of claim 10, wherein the secondary MLA has been trained based on at least a portion of the plurality of training feature vectors.

12. The method of claim 10, wherein each one of the MLA and the secondary MLA is a decision tree-based MLA.

13. The method of claim 12, wherein each one of the MLA and the secondary MLA is a respective decision tree forest.

14. The method of claim 13, wherein the secondary MLA has a lower dimensionality than that of the MLA.

15. The method of claim 12, wherein the decision-tree based MLA is a CatBoost decision tree MLA.

16. The method of claim 9, further comprising, in response to the replacing respective label with the machine-generated label in the given training feature vector:

generating a given reduced training feature vector based on the plurality of LiDAR features and the respective label; and including the given reduced training feature vector in the plurality of training feature vectors.

17. The method of claim 1, further comprising, during an in-use phase following the training phase, using the MLA to determine the in-use degree of degradation of the in-use sensed data of the LiDAR sensor of the SDC, the using comprising:

receiving, by the at least one processor from the LiDAR sensor, the in-use sensed data including an in-use point cloud representative of the given portion of the surrounding area of the SDC;

determining, by the at least one processor, based on the in-use point cloud, the plurality of LiDAR features associated with the given portion of the surrounding area of the SDC;

receiving, by the at least one processor from a camera sensor of the SDC, a respective in-use image representative of the given portion of the surrounding area of the SDC, the respective in-use image having been generated, by the camera sensor, at the same time as the in-use sensed data by the LiDAR sensor;

projecting, by the at least one processor, the in-use point cloud onto the respective in-use image to generate an in-use merged representation of the given portion of the surrounding area of the SDC including the statistical data of coverage of in-use objects present in the respective in-use image with LiDAR points of the in-use point cloud;

determining, by the at least one processor, for each in-use object present in the given portion of the surrounding area of the SDC, based on the statistical data, the plurality of enrichment features;

generating, by the at least one processor, based on the plurality of LiDAR features, the plurality of enrichment features associated with each in-use object present in the given portion of the surrounding area of the SDC, an in-use feature vector;

feeding, by the at least one processor, the in-use feature vector to the MLA to determine the in-use degree of degradation of the in-use sensed data generated by the LiDAR sensor, the in-use degree of degradation being indicative of a current visibility distance at which the LiDAR sensor is capable of recognizing in-use objects in the given portion of the surrounding area of the SDC; and in response to the in-use degree of degradation of the in-use sensed data exceeding a predetermined image data degradation threshold, causing, by the at least one processor, execution of at least one predetermined preventive action.

18. The method of claim 17, wherein the recognizing the in-use objects comprises recognizing in-use objects of a predetermined object class.

19. The method of claim 17, wherein the at least one predetermined preventive action comprises one of causing cleaning of the LiDAR sensor, generating a notification for maintenance of the LiDAR sensor, causing the SDC to decelerate, and causing the SDC to stop.

20. A system for determining a degree of image data degradation of a Light Detection and Ranging (LiDAR) sensor of a Self-Driving Car (SDC) using a Machine-Learning Algorithm (MLA), the system comprising: at least one processor communicatively coupled to the LiDAR sensor; and a non-transitory computer-readable medium storing instructions, which, when executed by the at least one processor, cause the system to: receive, from the LiDAR sensor, training sensed data including a given training point cloud representative of a given portion of a surrounding area of the SDC; determine, based on the given training point cloud, a plurality of LiDAR features associated with the given portion of the surrounding area of the SDC; receive, from a camera sensor of the SDC, a respective training image representative of the given portion of the surrounding area of the SDC, the respective training image having been generated, by the camera sensor, at a same time as the training sensed data by the LiDAR sensor; project the given training point cloud onto the respective training image to generate a merged representation of the given portion of the surrounding area of the SDC including statistical data of coverage of training objects present in the respective image with LiDAR points; determine, for each training object present in the given portion of the surrounding area of the SDC, based on the statistical data, a plurality of enrichment features; receive, for the merged representation of the given portion, a respective label indicative of a degradation degree of the training sensed data generated by the LiDAR sensor; generate, based on the plurality of LiDAR features, the plurality of enrichment features associated with each training object present in the given portion of the surrounding area of the SDC, and the respective label, a given training feature vector of a plurality of training feature vectors; train the MLA based on the plurality of training feature vectors to determine an in-use degree of degradation of in-use sensed data of the LiDAR sensor representative of in-use objects in the surrounding area of the SDC.

\* \* \* \* \*